US012602428B2

(12) United States Patent (10) Patent No.: US 12,602,428 B2
Goh et al. (45) Date of Patent: Apr. 14, 2026

(54) MEDIA CONTENT SEARCH IN CONNECTION WITH MULTIPLE MEDIA CONTENT SERVICES

(71) Applicant: Sonos, Inc., Goleta, CA (US)

(72) Inventors: King Shy Goh, San Francisco, CA (US); Lesley Slade, Ayer, MA (US); Matt Towers, Seattle, WA (US); Hilario Coimbra, Quincy, MA (US); Brandon Wright, Santa Barbara, CA (US); Sherwin Liu, Boston, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/936,775

(22) Filed: Nov. 4, 2024

(65) Prior Publication Data

US 2025/0181637 A1 Jun. 5, 2025

Related U.S. Application Data

(63) Continuation of application No. 17/957,509, filed on Sep. 30, 2022, now Pat. No. 12,135,744.

(60) Provisional application No. 63/250,690, filed on Sep. 30, 2021.

(51) Int. Cl.
*G06F 16/68* (2019.01)
*G06F 16/635* (2019.01)

(52) U.S. Cl.
CPC .......... *G06F 16/686* (2019.01); *G06F 16/635* (2019.01)

(58) Field of Classification Search
CPC ............................. G06F 16/635; G06F 16/686
See application file for complete search history.

(56) References Cited

U.S. PATENT DOCUMENTS

| | | | | | |
|---|---|---|---|---|---|
| 9,489,652 | B1* | 11/2016 | Hillyard | .............. | G06Q 10/087 |
| 2008/0126303 | A1* | 5/2008 | Park | ........................ | G06F 16/78 |
| 2008/0262914 | A1* | 10/2008 | Suveyke | ............ | G06Q 30/0256 |
| | | | | | 705/14.54 |
| 2013/0036354 | A1* | 2/2013 | Itskov | .................... | G07F 17/305 |
| | | | | | 715/716 |
| 2022/0191593 | A1* | 6/2022 | Murr | ...................... | G06F 16/635 |

OTHER PUBLICATIONS

European Patent Office, European EPC Article 94.3 mailed on Jun. 11, 2025, issued in connection with European Application No. 22797949.9, 7 pages.

* cited by examiner

*Primary Examiner* — Jay A Morrison

(57) ABSTRACT

An example computing system receives a media content search query from a controller configured to control media playback by one or more playback devices in a media playback system associated with a plurality of media content services. Based on the search query, the system generates a first set of search queries for the first media content service and a second set of search queries for the second media content service. The computing system receives search results from the first and second media content services and aggregates the search results such that the search results are organized based on (i) categories of media content items corresponding to the search results and (ii) the media content services from which the search results are received. The computing system sends the aggregated search results to the controller for display in their aggregated order.

20 Claims, 17 Drawing Sheets

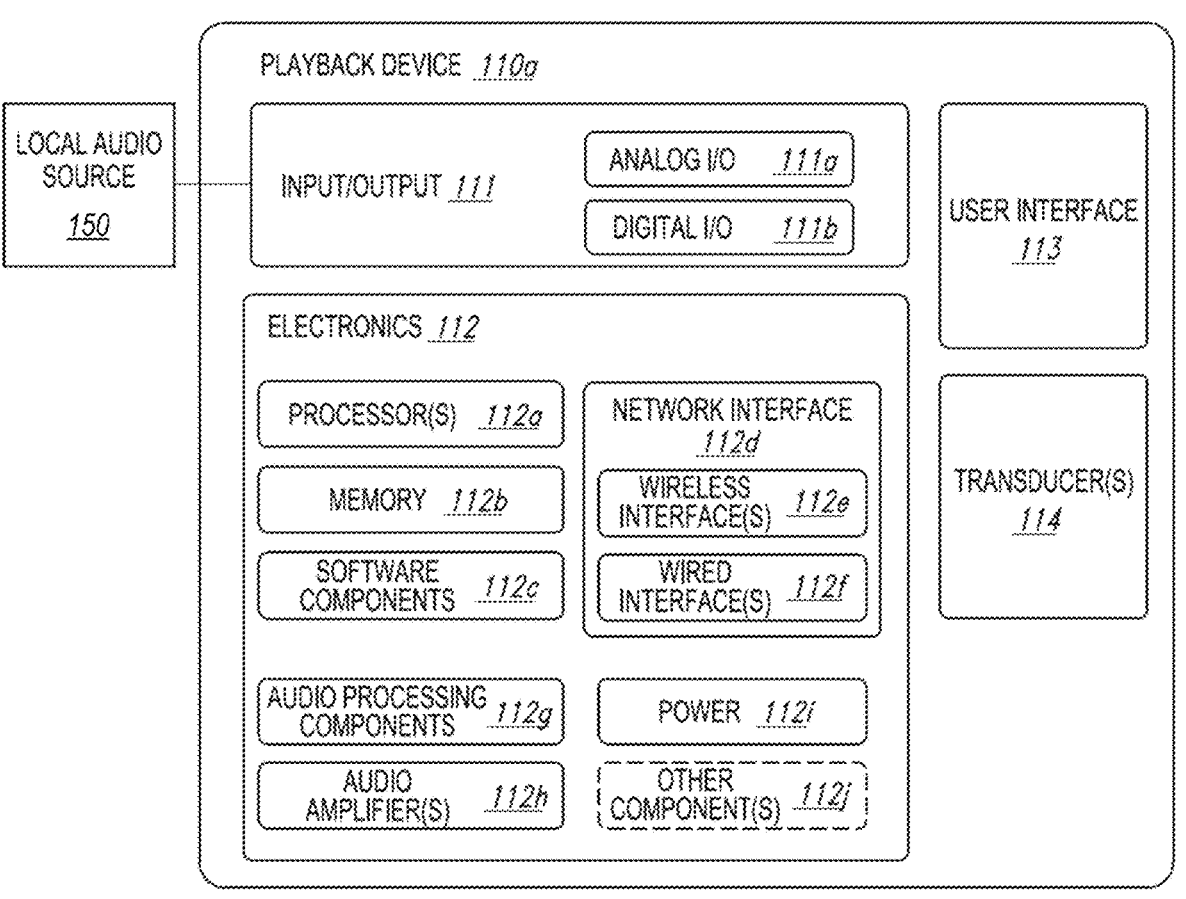
FIG. 1C
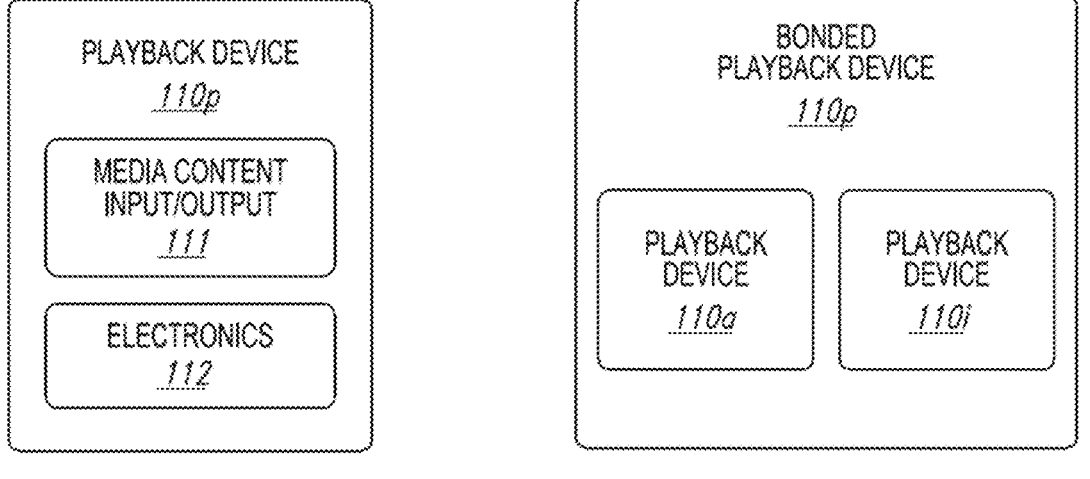
FIG. 1D     FIG. 1E

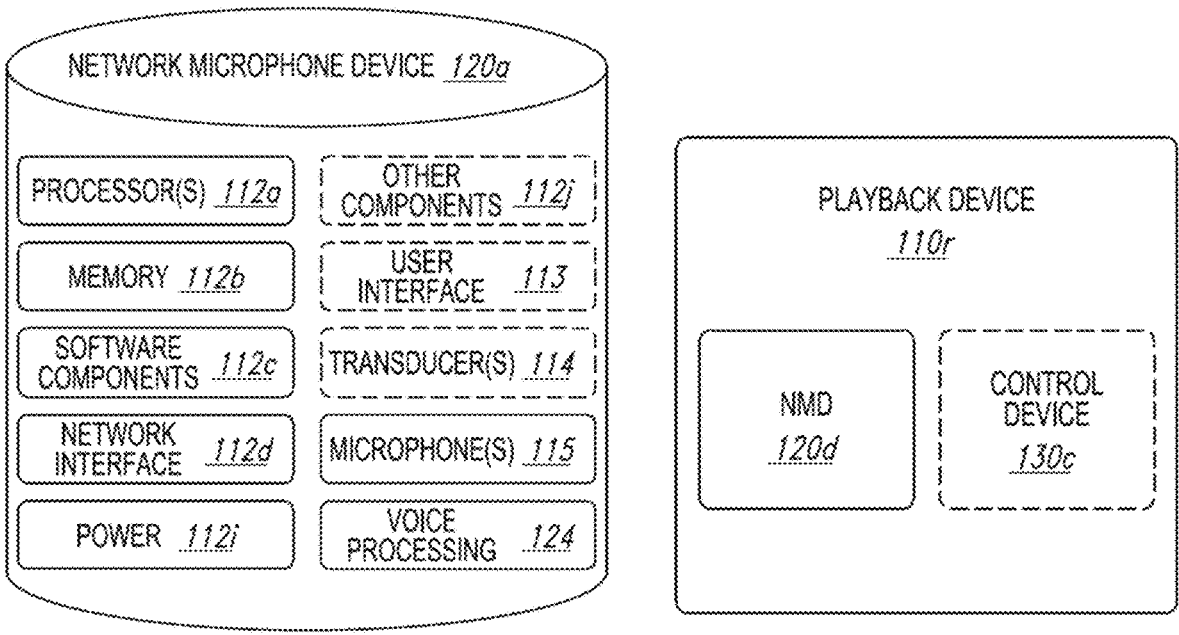
FIG. 1F
FIG. 1G
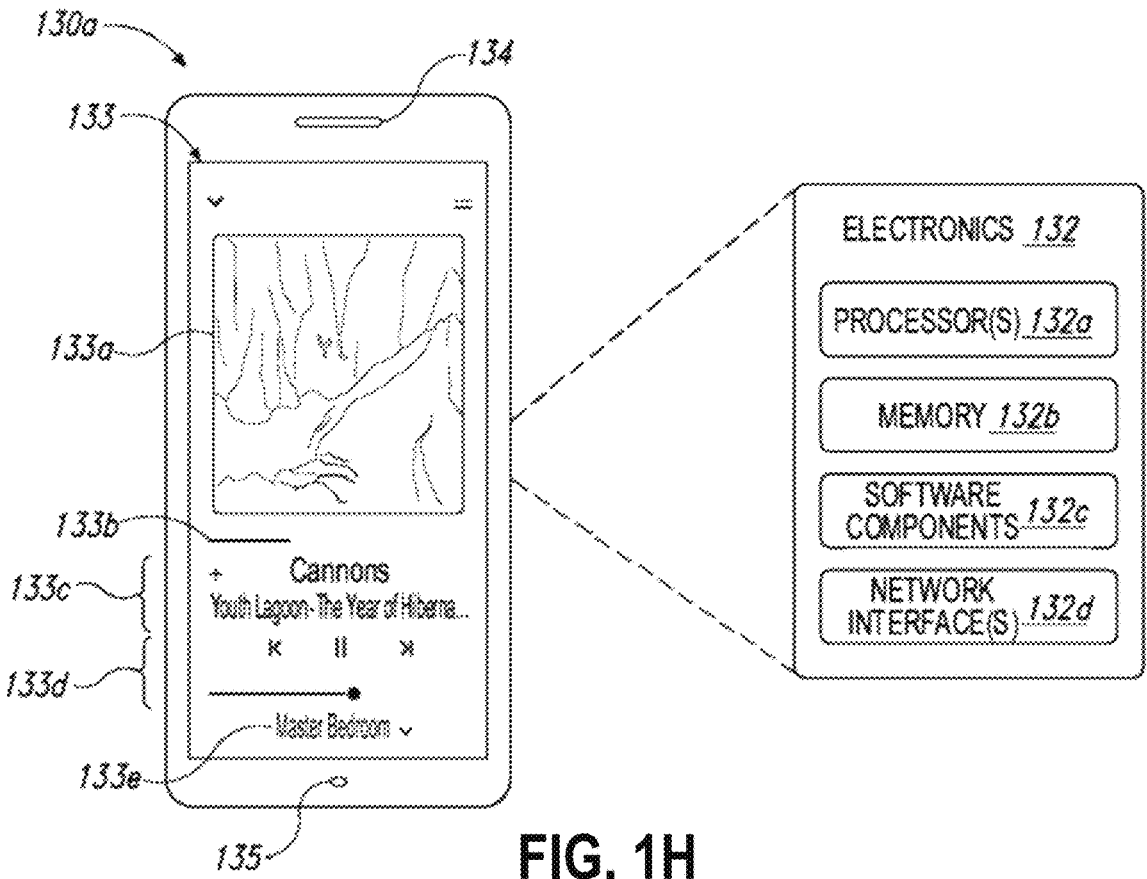
FIG. 1H

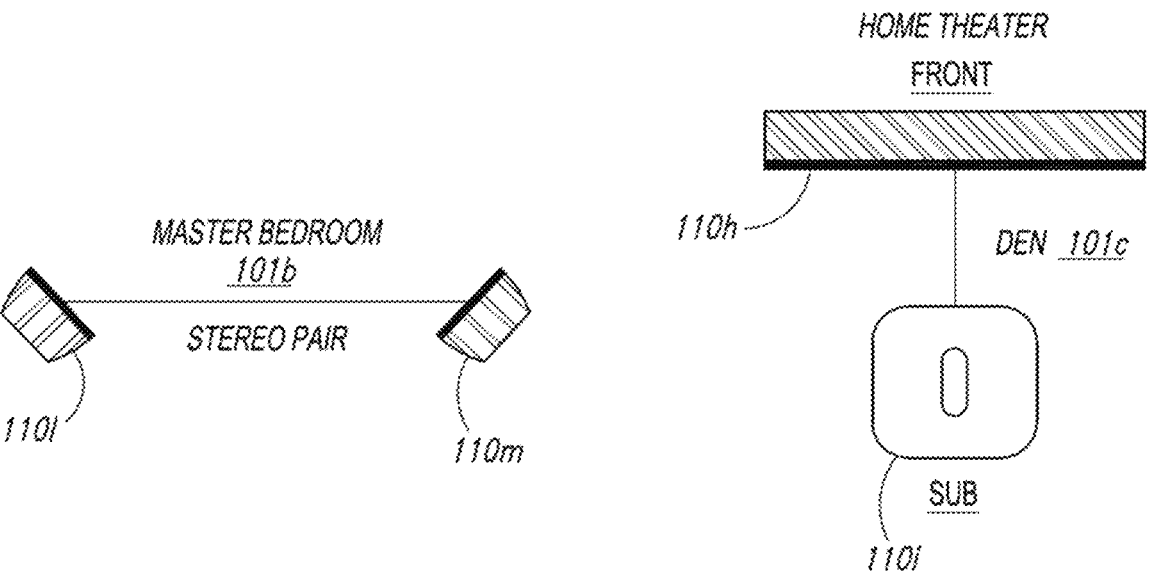
FIG. 1J                    FIG. 1K
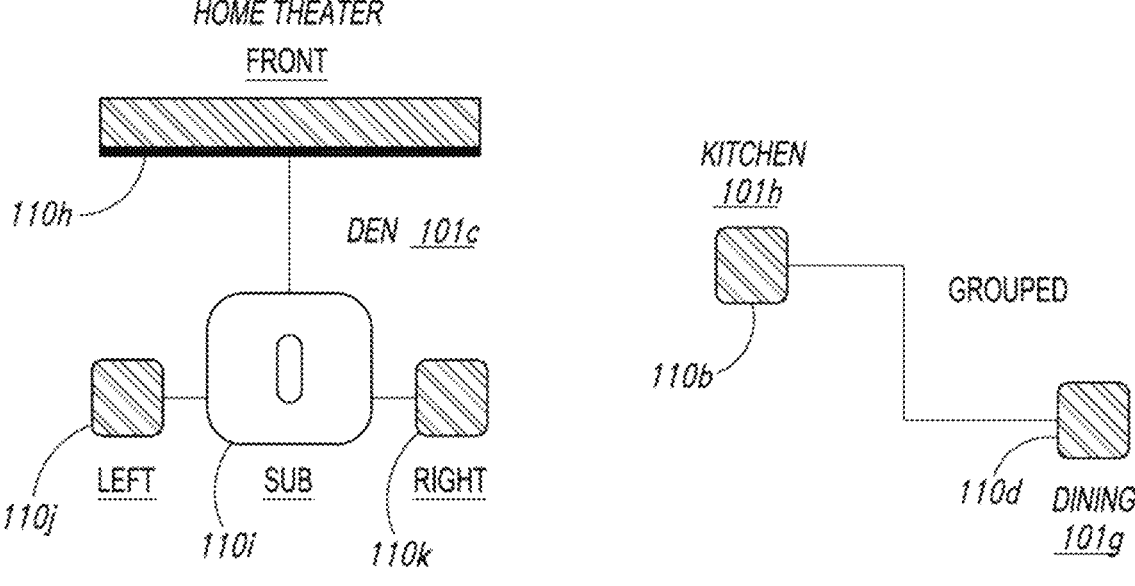
FIG. 1L                    FIG. 1M

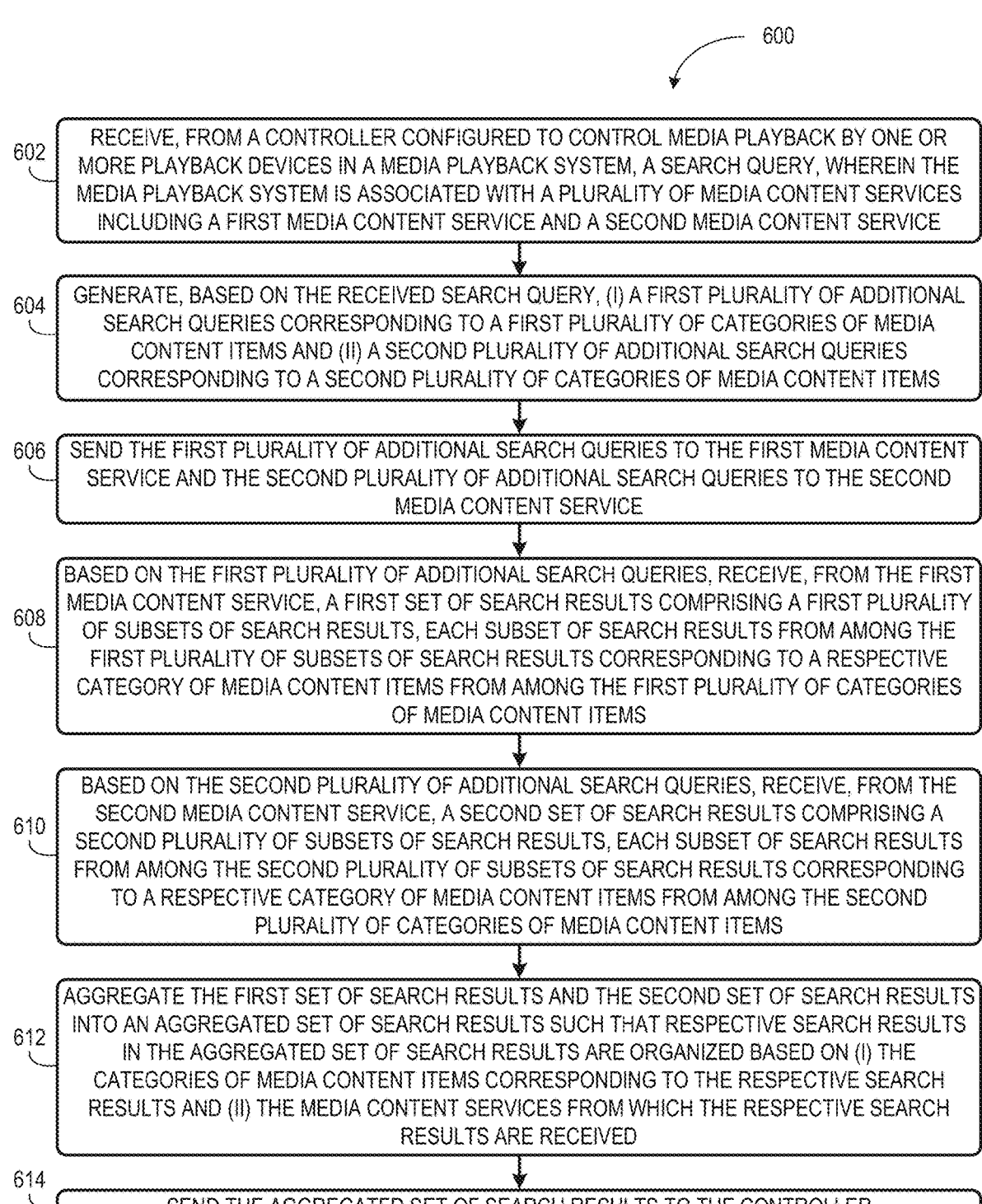

600

602 — RECEIVE, FROM A CONTROLLER CONFIGURED TO CONTROL MEDIA PLAYBACK BY ONE OR MORE PLAYBACK DEVICES IN A MEDIA PLAYBACK SYSTEM, A SEARCH QUERY, WHEREIN THE MEDIA PLAYBACK SYSTEM IS ASSOCIATED WITH A PLURALITY OF MEDIA CONTENT SERVICES INCLUDING A FIRST MEDIA CONTENT SERVICE AND A SECOND MEDIA CONTENT SERVICE

604 — GENERATE, BASED ON THE RECEIVED SEARCH QUERY, (I) A FIRST PLURALITY OF ADDITIONAL SEARCH QUERIES CORRESPONDING TO A FIRST PLURALITY OF CATEGORIES OF MEDIA CONTENT ITEMS AND (II) A SECOND PLURALITY OF ADDITIONAL SEARCH QUERIES CORRESPONDING TO A SECOND PLURALITY OF CATEGORIES OF MEDIA CONTENT ITEMS

606 — SEND THE FIRST PLURALITY OF ADDITIONAL SEARCH QUERIES TO THE FIRST MEDIA CONTENT SERVICE AND THE SECOND PLURALITY OF ADDITIONAL SEARCH QUERIES TO THE SECOND MEDIA CONTENT SERVICE

608 — BASED ON THE FIRST PLURALITY OF ADDITIONAL SEARCH QUERIES, RECEIVE, FROM THE FIRST MEDIA CONTENT SERVICE, A FIRST SET OF SEARCH RESULTS COMPRISING A FIRST PLURALITY OF SUBSETS OF SEARCH RESULTS, EACH SUBSET OF SEARCH RESULTS FROM AMONG THE FIRST PLURALITY OF SUBSETS OF SEARCH RESULTS CORRESPONDING TO A RESPECTIVE CATEGORY OF MEDIA CONTENT ITEMS FROM AMONG THE FIRST PLURALITY OF CATEGORIES OF MEDIA CONTENT ITEMS

610 — BASED ON THE SECOND PLURALITY OF ADDITIONAL SEARCH QUERIES, RECEIVE, FROM THE SECOND MEDIA CONTENT SERVICE, A SECOND SET OF SEARCH RESULTS COMPRISING A SECOND PLURALITY OF SUBSETS OF SEARCH RESULTS, EACH SUBSET OF SEARCH RESULTS FROM AMONG THE SECOND PLURALITY OF SUBSETS OF SEARCH RESULTS CORRESPONDING TO A RESPECTIVE CATEGORY OF MEDIA CONTENT ITEMS FROM AMONG THE SECOND PLURALITY OF CATEGORIES OF MEDIA CONTENT ITEMS

612 — AGGREGATE THE FIRST SET OF SEARCH RESULTS AND THE SECOND SET OF SEARCH RESULTS INTO AN AGGREGATED SET OF SEARCH RESULTS SUCH THAT RESPECTIVE SEARCH RESULTS IN THE AGGREGATED SET OF SEARCH RESULTS ARE ORGANIZED BASED ON (I) THE CATEGORIES OF MEDIA CONTENT ITEMS CORRESPONDING TO THE RESPECTIVE SEARCH RESULTS AND (II) THE MEDIA CONTENT SERVICES FROM WHICH THE RESPECTIVE SEARCH RESULTS ARE RECEIVED

614 — SEND THE AGGREGATED SET OF SEARCH RESULTS TO THE CONTROLLER

CATEGORY A

| |
|---|
| 1ST MEDIA CONTENT SERVICE – 1ST SEARCH RESULT |

| |
|---|
| 1ST MEDIA CONTENT SERVICE – 2ND SEARCH RESULT |

| |
|---|
| 2ND MEDIA CONTENT SERVICE – 1ST SEARCH RESULT |

| |
|---|
| 3RD MEDIA CONTENT SERVICE – 1ST SEARCH RESULT |

| |
|---|
| 1ST MEDIA CONTENT SERVICE – 3RD SEARCH RESULT |

| |
|---|
| 2ND MEDIA CONTENT SERVICE – 2ND SEARCH RESULT |

| |
|---|
| 3RD MEDIA CONTENT SERVICE – 2ND SEARCH RESULT |

⋮

CATEGORY B

| |
|---|
| 1ST MEDIA CONTENT SERVICE – 1ST SEARCH RESULT |

| |
|---|
| 1ST MEDIA CONTENT SERVICE – 2ND SEARCH RESULT |

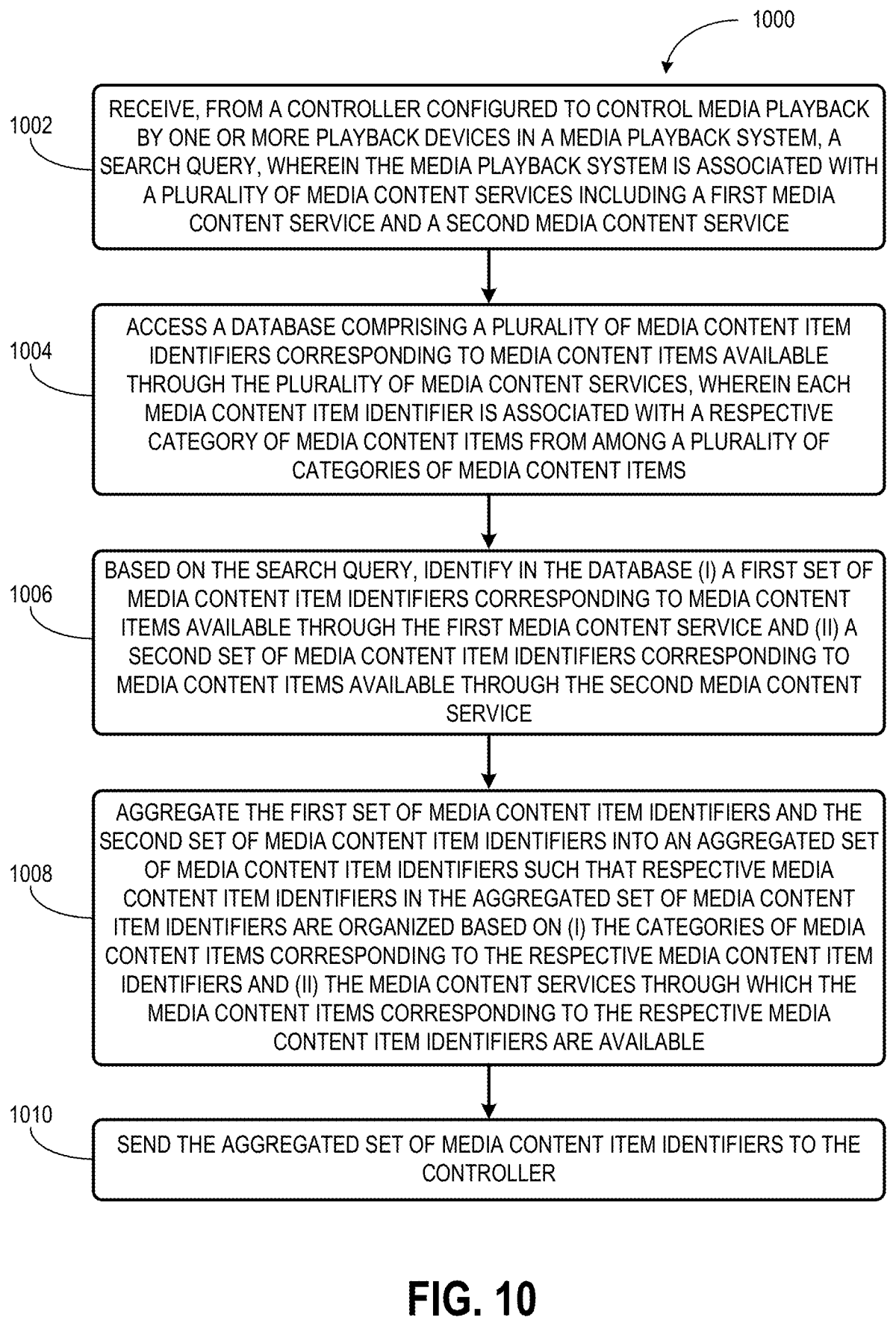

1002 — RECEIVE, FROM A CONTROLLER CONFIGURED TO CONTROL MEDIA PLAYBACK BY ONE OR MORE PLAYBACK DEVICES IN A MEDIA PLAYBACK SYSTEM, A SEARCH QUERY, WHEREIN THE MEDIA PLAYBACK SYSTEM IS ASSOCIATED WITH A PLURALITY OF MEDIA CONTENT SERVICES INCLUDING A FIRST MEDIA CONTENT SERVICE AND A SECOND MEDIA CONTENT SERVICE

1004 — ACCESS A DATABASE COMPRISING A PLURALITY OF MEDIA CONTENT ITEM IDENTIFIERS CORRESPONDING TO MEDIA CONTENT ITEMS AVAILABLE THROUGH THE PLURALITY OF MEDIA CONTENT SERVICES, WHEREIN EACH MEDIA CONTENT ITEM IDENTIFIER IS ASSOCIATED WITH A RESPECTIVE CATEGORY OF MEDIA CONTENT ITEMS FROM AMONG A PLURALITY OF CATEGORIES OF MEDIA CONTENT ITEMS

1006 — BASED ON THE SEARCH QUERY, IDENTIFY IN THE DATABASE (I) A FIRST SET OF MEDIA CONTENT ITEM IDENTIFIERS CORRESPONDING TO MEDIA CONTENT ITEMS AVAILABLE THROUGH THE FIRST MEDIA CONTENT SERVICE AND (II) A SECOND SET OF MEDIA CONTENT ITEM IDENTIFIERS CORRESPONDING TO MEDIA CONTENT ITEMS AVAILABLE THROUGH THE SECOND MEDIA CONTENT SERVICE

1008 — AGGREGATE THE FIRST SET OF MEDIA CONTENT ITEM IDENTIFIERS AND THE SECOND SET OF MEDIA CONTENT ITEM IDENTIFIERS INTO AN AGGREGATED SET OF MEDIA CONTENT ITEM IDENTIFIERS SUCH THAT RESPECTIVE MEDIA CONTENT ITEM IDENTIFIERS IN THE AGGREGATED SET OF MEDIA CONTENT ITEM IDENTIFIERS ARE ORGANIZED BASED ON (I) THE CATEGORIES OF MEDIA CONTENT ITEMS CORRESPONDING TO THE RESPECTIVE MEDIA CONTENT ITEM IDENTIFIERS AND (II) THE MEDIA CONTENT SERVICES THROUGH WHICH THE MEDIA CONTENT ITEMS CORRESPONDING TO THE RESPECTIVE MEDIA CONTENT ITEM IDENTIFIERS ARE AVAILABLE

1010 — SEND THE AGGREGATED SET OF MEDIA CONTENT ITEM IDENTIFIERS TO THE CONTROLLER

FIG. 10

MEDIA CONTENT SEARCH IN CONNECTION WITH MULTIPLE MEDIA CONTENT SERVICES

CROSS-REFERENCE TO RELATED APPLICATIONS

This application is a continuation of U.S. application Ser. No. 17/957,509, filed Sep. 30, 2022 and entitled "Media Content Search in Connection with Multiple Media Content Services," which claims priority to U.S. Provisional Application No. 63/250,690, filed Sep. 30, 2021, and entitled "Media Content Search in Connection with Multiple Media Content Services," the contents of each of which are incorporated herein by reference in their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of an example playback device.

FIG. 1D is a block diagram of an example playback device.

FIG. 1E is a block diagram of an example playback device.

FIG. 1F is a block diagram of an example network microphone device.

FIG. 1G is a block diagram of an example playback device.

FIG. 1H is a partially schematic diagram of an example control device.

FIGS. 1J through 1M are schematic diagrams of example corresponding media playback system zones.

FIG. 6 is a flowchart showing example operations for searching for media content items available through multiple media content services.

FIG. 8 is a diagram of an example aggregated set of search results.

FIG. 10 is a flowchart showing example operations for searching for media content items available through multiple media content services.

Figure 1A:
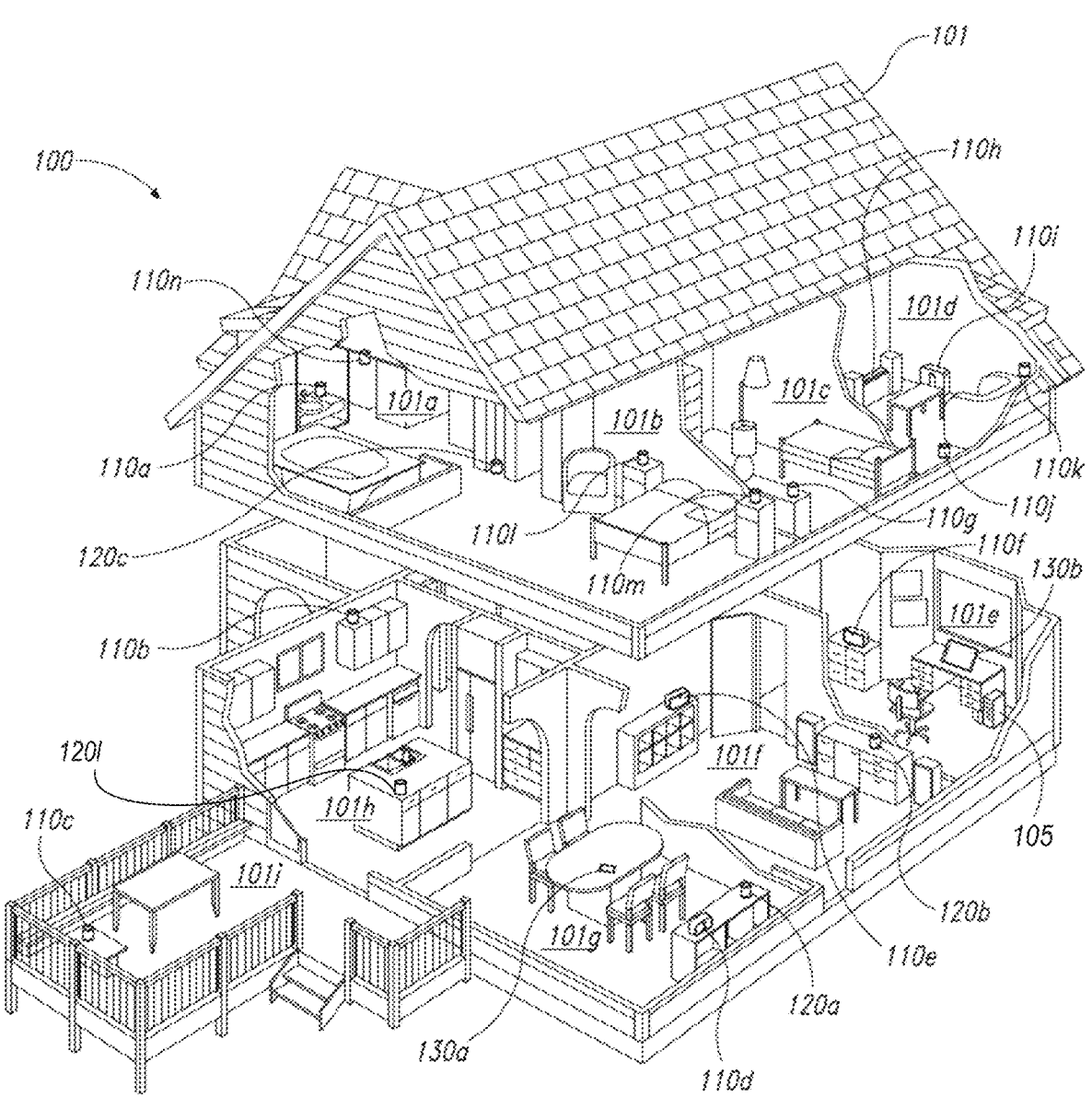
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

SONOS, Inc. has been a consistent innovator in the space of playback control over the past decade. For example, SONOS, Inc. led the transition from dedicated hardware controllers, such as the CR100 and CR200, to a controller application executable on a user's smartphone (or other computing device) with the introduction of the SONOS app. The controller application may allow a user to control playback devices in the media playback system. For instance, the controller application, via a host computing device, can be configured to receive user input related to the media playback system and, in response, cause one or more devices in the media playback system to perform an action or operation corresponding to the user input. The action or operation can be, for example, related to initiating, stopping, or otherwise modifying playback of media content by the devices. In order to provide such functionality, the controller application, via the host computing device, may cause the devices in the media playback system to play back media content available through one or more media content services associated with the media playback system. Examples of media content services include SPOTIFY, APPLE MUSIC, PANDORA, AMAZON MUSIC, and YOUTUBE MUSIC, to name a few.

In 2012, Sonos filed U.S. application Ser. No. 13/554,214, which describes techniques for enabling media content services to provide media content to media playback systems, as well as user interfaces for allowing users of the media playback systems to access such content for playback through the media playback systems. U.S. application Ser. No. 13/554,214, filed Jul. 20, 2012, titled "Web-based music partner systems and methods," is incorporated by reference herein in its entirety. Additional concepts beyond those specifically discussed above are disclosed in U.S. application Ser. No. 13/554,214.

In U.S. application Ser. No. 13/239,077, Sonos described techniques for sharing media content among users that are subscribed to different media content services. When a first user shares media content from a first media content service with a second user, the second user may cause a media playback system to stream the shared media content from a second media content service. U.S. application Ser. No. 13/239,077, filed Sep. 21, 2011, titled "Methods and systems to share media," and issued as U.S. Pat. No. 9,286,384, is incorporated by reference herein in its entirety. Additional concepts beyond those specifically discussed above are disclosed in U.S. application Ser. No. 13/239,077.

In U.S. application Ser. No. 13/693,540, Sonos described techniques for searching for media content available for playback through a media content service and causing a media playback system to play back the media content. U.S. application Ser. No. 13/693,540, filed Dec. 4, 2012, titled "Media content search based on metadata," and issued as U.S. Pat. No. 10,055,491, is incorporated by reference herein in its entirety. Additional concepts beyond those specifically discussed above are disclosed in U.S. application Ser. No. 13/693,540.

In U.S. application Ser. No. 14/041,891, Sonos described techniques for, while a media playback system plays back media content from one media content service, searching for the same media content through another media content service. U.S. application Ser. No. 14/041,891, filed Sep. 30, 2013, titled "Audio content search in a media playback system," and issued as U.S. Pat. No. 10,095,785, is incorporated by reference herein in its entirety. Additional concepts beyond those specifically discussed above are disclosed in U.S. application Ser. No. 14/041,891.

In U.S. application Ser. No. 14/222,234, Sonos described techniques for building a media-item database using metadata from multiple media content services. U.S. application Ser. No. 14/222,234, filed Mar. 21, 2014, titled "Facilitating streaming media access via a media-item database," and issued as U.S. Pat. No. 10,331,736, is incorporated by reference herein in its entirety. Additional concepts beyond those specifically discussed above are disclosed in U.S. application Ser. No. 14/222,234.

In U.S. application Ser. No. 14/218,546, Sonos described techniques for displaying search results from multiple media content services. U.S. application Ser. No. 14/218,546, filed Mar. 18, 2014, titled "Dynamic display of filter criteria," and issued as U.S. Pat. No. 9,892,118, is incorporated by reference herein in its entirety. Additional concepts beyond those specifically discussed above are disclosed in U.S. application Ser. No. 14/218,546.

In U.S. application Ser. No. 14/447,410, Sonos described techniques for indexing a searchable database of media content items. U.S. application Ser. No. 14/447,410, filed Jul. 30, 2014, titled "Contextual indexing of media items,"

and issued as U.S. Pat. No. 9,524,339, is incorporated by reference herein in its entirety. Additional concepts beyond those specifically discussed above are disclosed in U.S. application Ser. No. 14/447,410.

Using existing techniques, in order to facilitate playback of media content items offered by media content services, a host computing device executing a controller application may be communicatively coupled to a search service over a WAN, such as the Internet, and the search service may be likewise communicatively coupled to the media content services. The host computing device may send to the search service a search query for a particular media content item, and the search service may query the media content services for the particular media content item.

However, when querying the media content services for the particular media content item, the search service may be restricted in the manner in which it can submit search queries to the media content services. Such limitations may stem from requirements imposed by the media content services or by the search service itself. In some examples, a media content service and/or the search service may be configured to process search queries in a specific format. For instance, a media content service may categorize its media content items into various categories, and the media content service may be configured to receive search queries that specify a particular category to be searched. Examples of categories of media content items include an artist category, a title category, an album category, a playlist category, a media station category, or a podcast category, to name a few. As such, when sending a query to a media content service, the search service may need to format the search query to specify one of these categories, or some other media content item category.

In such implementations with restrictions on search formats, the user may be required to specify a particular category to be searched every time the user wishes to submit a search query for media content, thus creating additional steps for the user than merely inputting a search term on its own. Additionally, a user may prefer to apply a single search query to multiple categories of media items at once, but these restrictive search format requirements limit search queries and their corresponding search results to a single particular category of media content items.

To help address these and other issues, the present disclosure provides systems and methods for searching for media content items offered by multiple media content services that improve upon conventional techniques. For instance, as described herein, a search service may receive a search query from a computing device executing a controller application, also referred to herein as a "controller." The search query may be a plain language query that does not comply with the restrictive search format requirements of the media content services associated with a media playback system of the controller. For instance, the search query may fail to specify a corresponding category of media content items. Based on the query, the search service may generate multiple sets of additional queries, each set corresponding to one of the media content services associated with the media playback system of the controller, and each additional query complying with the restrictive search format requirements of the media content services. For instance, in examples where a given media content service requires search queries to specify a particular category of media content items, the search service may generate a set of additional queries that includes a separate additional query for each category of media content item available through the given media content service.

The search service may send the additional queries to the media content services associated with the media playback system and, based on the additional queries, receive search results from the media content services identifying media content items available through the media content services. For each additional query sent to a media content service, the search service may receive a set of search results corresponding to the category specified by the additional query. Thus, when the search service sends a set of additional queries to a given media content service, the search service may receive multiple sets of search results (e.g., one set of search results for each additional query in the set of additional queries).

The search service may aggregate the search results received from the media content services and, when doing so, may organize the search results into a particular order. For instance, the search service may organize the search results from the media content services into groups based on their associated categories of media content items. And within each group, the search service may further organize the search results based on the media content services that provided the search results. The search service may then send the aggregated search results to the controller for display to a user. The controller may then display the results according to listening history, user preferences, and/or statistical analyses of the aggregated search results, among other possibilities. As such, the controller may prominently display results most pertinent to the plain language query.

In some embodiments, the techniques described herein may be implemented in a computing device that includes at least one processor, a non-transitory computer-readable medium, and program instructions stored on the non-transitory computer-readable medium that are executable by the at least one processor such that the computing device is configured to (i) receive, from a controller configured to control media playback by one or more playback devices in a media playback system, a search query, wherein the media playback system is associated with a plurality of media content services including a first media content service and a second media content service; (ii) generate, based on the received search query, (a) a first plurality of additional search queries corresponding to a first plurality of categories of media content items and (b) a second plurality of additional search queries corresponding to a second plurality of categories of media content items; (iii) send the first plurality of additional search queries to the first media content service; (iv) send the second plurality of additional search queries to the second media content service; (v) based on the first plurality of additional search queries, receive, from the first media content service, a first set of search results comprising a first plurality of subsets of search results, each subset of search results from among the first plurality of subsets of search results corresponding to a respective category of media content items from among the first plurality of categories of media content items; (vi) based on the second plurality of additional search queries, receive, from the second media content service, a second set of search results comprising a second plurality of subsets of search results, each subset of search results from among the second plurality of subsets of search results corresponding to a respective category of media content items from among the second plurality of categories of media content items; (vii) aggregate the first set of search results and the second set of search results into an aggregated set of search results such that respective search results in the aggregated set of search results are organized based on (a) the categories of media content items corresponding to the respective search results and (b) the media content items corresponding to the respective search results and (b) the media content services from which the respective search results are received; and (viii) send the aggregated set of search results to the controller.

In another aspect, a non-transitory computer-readable medium is provided. The non-transitory computer-readable medium is provisioned with program instructions that, when executed by at least one processor, cause a computing device to (i) receive, from a controller configured to control media playback by one or more playback devices in a media playback system, a search query, wherein the media playback system is associated with a plurality of media content services including a first media content service and a second media content service; (ii) generate, based on the received search query, (a) a first plurality of additional search queries corresponding to a first plurality of categories of media content items and (b) a second plurality of additional search queries corresponding to a second plurality of categories of media content items; (iii) send the first plurality of additional search queries to the first media content service; (iv) send the second plurality of additional search queries to the second media content service; (v) based on the first plurality of additional search queries, receive, from the first media content service, a first set of search results comprising a first plurality of subsets of search results, each subset of search results from among the first plurality of subsets of search results corresponding to a respective category of media content items from among the first plurality of categories of media content items; (vi) based on the second plurality of additional search queries, receive, from the second media content service, a second set of search results comprising a second plurality of subsets of search results, each subset of search results from among the second plurality of subsets of search results corresponding to a respective category of media content items from among the second plurality of categories of media content items; (vii) aggregate the first set of search results and the second set of search results into an aggregated set of search results such that respective search results in the aggregated set of search results are organized based on (a) the categories of media content items corresponding to the respective search results and (b) the media content services from which the respective search results are received; and (viii) send the aggregated set of search results to the controller.

In yet another aspect, a method carried out by a computing device includes, (i) receiving, from a controller configured to control media playback by one or more playback devices in a media playback system, a search query, wherein the media playback system is associated with a plurality of media content services including a first media content service and a second media content service; (ii) generating, based on the received search query, (a) a first plurality of additional search queries corresponding to a first plurality of categories of media content items and (b) a second plurality of additional search queries corresponding to a second plurality of categories of media content items; (iii) sending the first plurality of additional search queries to the first media content service; (iv) sending the second plurality of additional search queries to the second media content service; (v) based on the first plurality of additional search queries, receiving, from the first media content service, a first set of search results comprising a first plurality of subsets of search results, each subset of search results from among the first plurality of subsets of search results corresponding to a respective category of media content items from among the first plurality of categories of media content items; (vi) based on the second plurality of additional search queries, receiving, from the second media content service, a second set of search results comprising a second plurality of subsets of search results, each subset of search results from among the second plurality of subsets of search results corresponding to a respective category of media content items from among the second plurality of categories of media content items; (vii) aggregating the first set of search results and the second set of search results into an aggregated set of search results such that respective search results in the aggregated set of search results are organized based on (a) the categories of media content items corresponding to the respective search results and (b) the media content services from which the respective search results are received; and (viii) sending the aggregated set of search results to the controller.

In some embodiments, the techniques described herein may be implemented in a computing device that includes at least one processor, a non-transitory computer-readable medium, and program instructions stored on the non-transitory computer-readable medium that are executable by the at least one processor such that the computing device is configured to (i) receive, from a controller configured to control media playback by one or more playback devices in a media playback system, a search query, wherein the media playback system is associated with a plurality of media content services including a first media content service and a second media content service; (ii) access a database comprising a plurality of media content item identifiers corresponding to media content items available through the plurality of media content services, wherein each media content item identifier is associated with a respective category of media content items from among a plurality of categories of media content items; (iii) based on the search query, identify in the database (a) a first set of media content item identifiers corresponding to media content items available through the first media content service and (b) a second set of media content item identifiers corresponding to media content items available through the second media content service; (iv) aggregate the first set of media content item identifiers and the second set of media content item identifiers into an aggregated set of media content item identifiers such that respective media content item identifiers in the aggregated set of media content item identifiers are organized based on (a) the categories of media content items corresponding to the respective media content item identifiers and (b) the media content services through which the media content items corresponding to the respective media content item identifiers are available; and (v) send the aggregated set of media content item identifiers to the controller.

In another aspect, a non-transitory computer-readable medium is provided. The non-transitory computer-readable medium is provisioned with program instructions that, when executed by at least one processor, cause a computing device to (i) receive, from a controller configured to control media playback by one or more playback devices in a media playback system, a search query, wherein the media playback system is associated with a plurality of media content services including a first media content service and a second media content service; (ii) access a database comprising a plurality of media content item identifiers corresponding to media content items available through the plurality of media content services, wherein each media content item identifier is associated with a respective category of media content items from among a plurality of categories of media content items; (iii) based on the search query, identify in the database (a) a first set of media content item identifiers corresponding to media content items available through the first media content service and (b) a second set of media content item identifiers corresponding to media content items available through the second media content service; (iv) aggregate the first set of media content item identifiers and the second set of media content item identifiers into an aggregated set of media content item identifiers such that respective media content item identifiers in the aggregated set of media content item identifiers are organized based on (a) the categories of media content items corresponding to the respective media content item identifiers and (b) the media content services through which the media content items corresponding to the respective media content item identifiers are available; and (v) send the aggregated set of media content item identifiers to the controller.

In yet another aspect, a method carried out by a computing device includes, (i) receiving, from a controller configured to control media playback by one or more playback devices in a media playback system, a search query, wherein the media playback system is associated with a plurality of media content services including a first media content service and a second media content service; (ii) accessing a database comprising a plurality of media content item identifiers corresponding to media content items available through the plurality of media content services, wherein each media content item identifier is associated with a respective category of media content items from among a plurality of categories of media content items; (iii) based on the search query, identifying in the database (a) a first set of media content item identifiers corresponding to media content items available through the first media content service and (b) a second set of media content item identifiers corresponding to media content items available through the second media content service; (iv) aggregating the first set of media content item identifiers and the second set of media content item identifiers into an aggregated set of media content item identifiers such that respective media content item identifiers in the aggregated set of media content item identifiers are organized based on (a) the categories of media content items corresponding to the respective media content item identifiers and (b) the media content services through which the media content items corresponding to the respective media content item identifiers are available; and (v) sending the aggregated set of media content item identifiers to the controller.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

II. Suitable Operating Environment a. Suitable Media Playback System

Figure 1B:
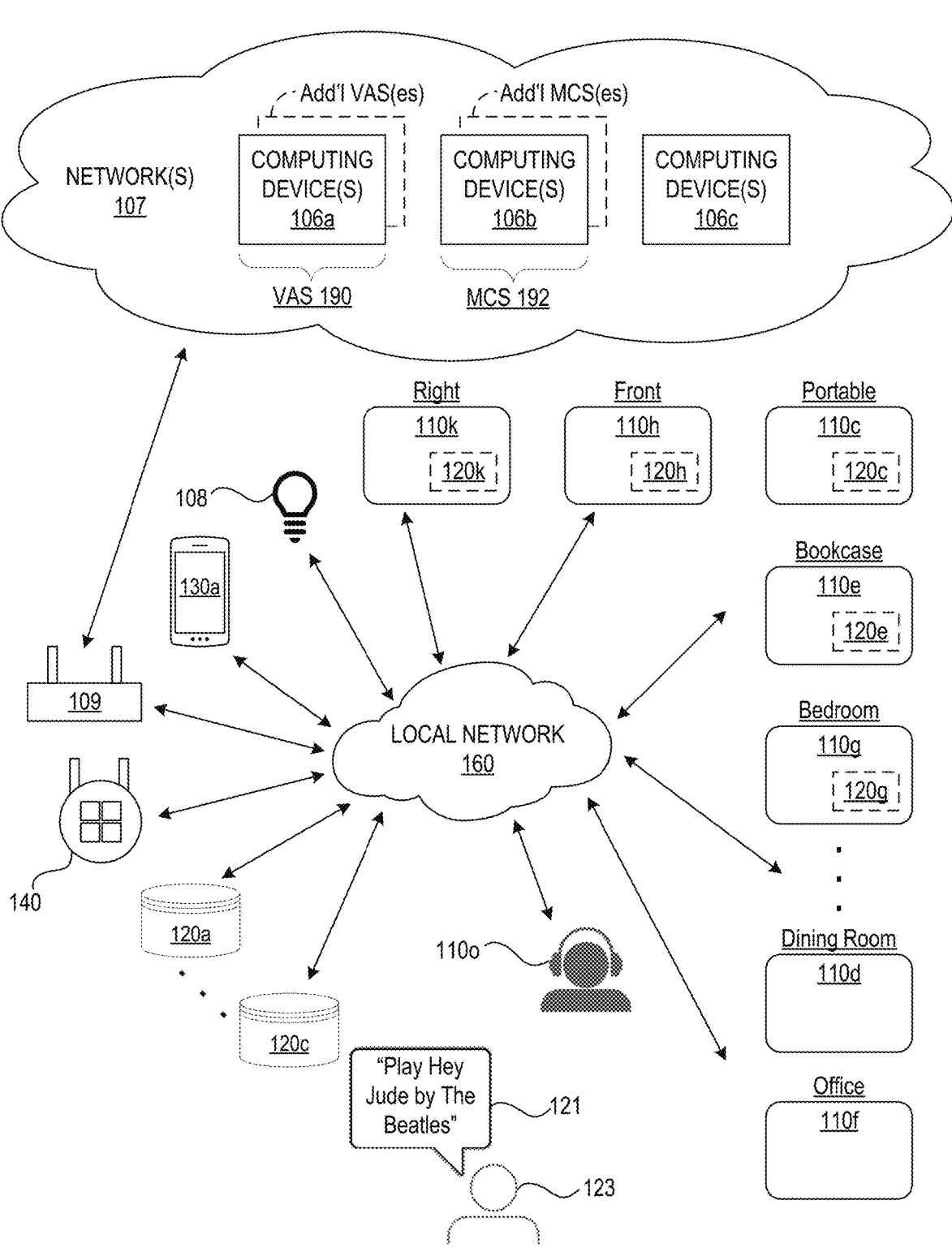
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110*a-o*), one or more network microphone devices ("NMDs") 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 100a) in synchrony with a second playback device (e.g., the playback device 100b). Interactions between the playback devices 110, NMDs 120, and/or control devices 130 of the MPS 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the outdoor patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140, and a local computing device 105 (FIG. 1A). In embodiments described below, one or more of the various playback devices 110 may be configured as portable playback devices, while others may be configured as stationary playback devices. For example, the headphones 1100 (FIG. 1B) are a portable playback device, while the playback device 110e on the bookcase may be a stationary device. As another example, the playback device 110c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110j in the Den 101d (FIG. 1A), which may be designated as the "Left" device, may have a point-to-point connection with the playback device 110k, which is also in the Den 101d and may be designated as the "Right" device. In a related embodiment, the Left playback device 110j may communicate with other network devices, such as the playback device 110h, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WiFi network, a Z-Wave network, etc.) and/or one or more personal area networks (PANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the computing devices 106a may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY, PANDORA, AMAZON MUSIC, GOOGLE PLAY, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WiFi network). In some embodiments, the MPS 100 is implemented without the local network 160, and the various devices comprising the MPS 100 can communicate with each other, for example, via one or more direct connections, PANs, telecommunication networks (e,g., an LTE network or a 5G network, etc.), and/or other suitable communication links.

In some embodiments, audio content sources may be regularly added or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 110 may take the form of or include an on-board (e.g., integrated) network microphone device configured to receive voice utterances from a user. For example, the playback devices 110c-110h, and 110k include or are otherwise equipped with corresponding NMDs 120c-120h, and 120k, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 120l may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110e because it is physically situated on a bookcase. Similarly, the NMD 120l may be assigned the named "Island" because it is physically situated on an island countertop in the Kitchen 101h (FIG. 1A). Some playback devices may be assigned names according to a zone or room, such as the playback devices 110g, 110d, and 110f, which are named "Bedroom," "Dining Room," and "Office," respectively. Further, certain playback devices may have functionally descriptive names. For example, the playback devices 110k and 110h are assigned the names "Right" and "Front," respectively, because these two devices are configured to provide specific audio channels during media playback in the zone of the Den 101d (FIG. 1A). The playback device 110c in the Patio may be named "Portable" because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106c of the MPS 100 may exchange various feedback, information, instructions, and/ or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Patent Publication No. 2017-0242653 published Aug. 24, 2017, and titled "Voice Control of a Media Playback System," which is incorporated herein by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110e in the environment 101 (FIG. 1A) is in relatively close proximity to the NMD-equipped Living Room playback device 120b, and both devices 110e and 120b may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 120l in the Kitchen 101h (FIG. 1A) may be assigned to the Dining Room playback device 110d, which is in relatively close proximity to the Island NMD 120l. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106a-c. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WiFi, BLUETOOTH, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 150 via the input/output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110a does not include an input/output 111 and receives all audio content via the local network 160.

The playback device 110a further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106a-c via the local network 160 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power components 112i (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112j (e.g., one or more sensors, video displays, touchscreens, battery charging bases). In some embodiments, the playback device 110a and electronics 112 may further include one or more voice processing components that are operable coupled to one or more microphones, and other components as described below with reference to FIGS. 1F and 1G.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112d is configured to facilitate a transmission of data between the playback device 110a and one or more other devices on a data network. The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WiFi, BLUETOOTH, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112$d$ includes the wired interface 112$f$ and excludes the wireless interface 112$e$. In some embodiments, the electronics 112 excludes the network interface 112$d$ altogether and transmits and receives media content and/or other data via another communication path (e.g., the input/output 111).

The audio components 112$g$ are configured to process and/or filter data comprising media content received by the electronics 112 (e.g., via the input/output 111 and/or the network interface 112$d$) to produce output audio signals. In some embodiments, the audio processing components 112$g$ comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112$g$ can comprise one or more subcomponents of the processors 112$a$. In some embodiments, the electronics 112 omits the audio processing components 112$g$. In some aspects, for example, the processors 112$a$ execute instructions stored on the memory 112$b$ to perform audio processing operations to produce the output audio signals.

The amplifiers 112$h$ are configured to receive and amplify the audio output signals produced by the audio processing components 112$g$ and/or the processors 112$a$. The amplifiers 112$h$ can comprise electronic devices and/or components configured to amplify audio signals to levels sufficient for driving one or more of the transducers 114. In some embodiments, for example, the amplifiers 112$h$ include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112$h$ comprise a suitable combination of two or more of the foregoing types of power amplifiers. Moreover, in some embodiments, individual ones of the amplifiers 112$h$ correspond to individual ones of the transducers 114. In other embodiments, however, the electronics 112 includes a single one of the amplifiers 112$h$ configured to output amplified audio signals to a plurality of the transducers 114. In some other embodiments, the electronics 112 omits the amplifiers 112$h$.

In some implementations, the power components 112$i$ of the playback device 110$a$ may additionally include an internal power source (e.g., one or more batteries) configured to power the playback device 110$a$ without a physical connection to an external power source. When equipped with the internal power source, the playback device 110$a$ may operate independent of an external power source. In some such implementations, an external power source interface may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more of lights (e.g., LEDs) and the speakers to provide visual and/or audio feedback to a user.

The transducers 114 (e.g., one or more speakers and/or speaker drivers) receive the amplified audio signals from the amplifier 112$h$ and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110$a$ may include a speaker interface for connecting the playback device to external speakers. In other embodiments, the playback device 110$a$ may include an audio interface for connecting the playback device to an external audio amplifier or audio-visual receiver.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110$p$ comprising the input/output 111 and electronics 112 without the user interface 113 or transducers 114.

FIG. 1E is a block diagram of a bonded playback device 110$q$ comprising the playback device 110$a$ (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with playback device 110*i*, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

Figure 4:
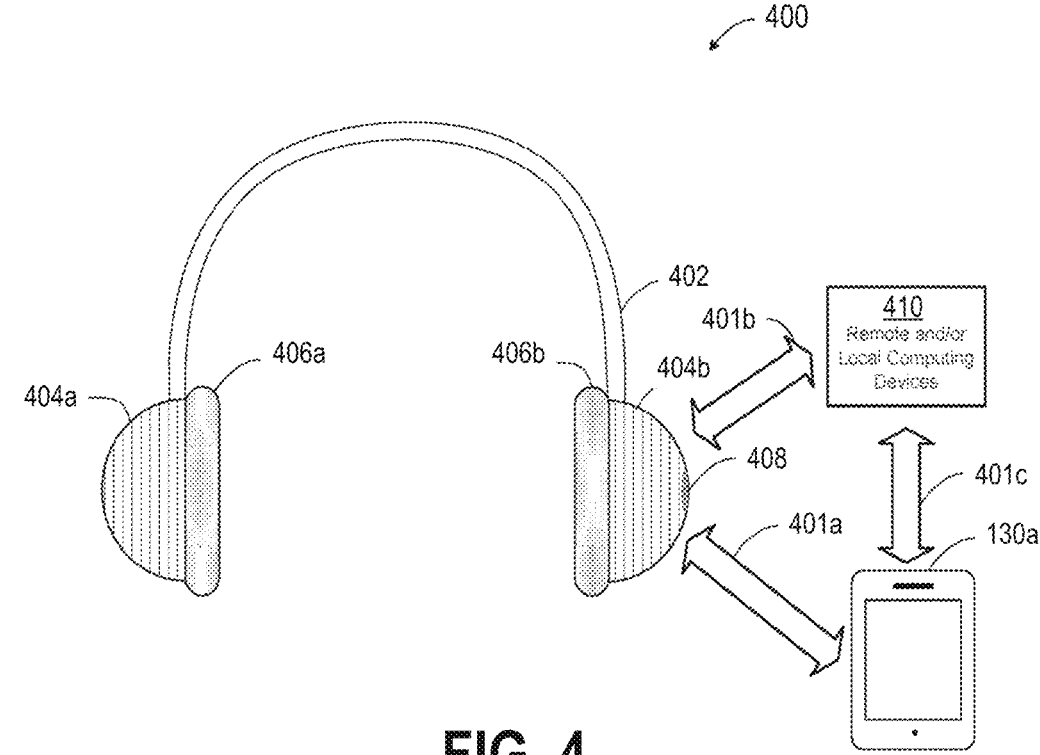
FIG. 4 is a diagram of an example headset assembly for the playback device of FIG. 3.

In some embodiments, one or more of the playback devices 110 may take the form of a wired and/or wireless headphone (e.g., an over-ear headset, an on-ear headset, or an in-ear headset). For instance, FIG. 4 shows an example headset assembly 400 ("headset 400") for such an implementation of one of the playback devices 110. As shown, the headset 400 includes a headband 402 that couples a first earcup 404*a* to a second earcup 404*b*. Each of the earcups 404*a* and 404*b* may house any portion of the electronic components in the playback device 110, such as one or more speakers. Further, one or more of the earcups 404*a* and 404*b* may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406*a* and 406*b* that are coupled to ear cups 404*a* and 404*b*, respectively. The ear cushions 406*a* and 406*b* may provide a soft barrier between the head of a user and the earcups 404*a* and 404*b*, respectively, to improve user comfort and/or provide acoustic isolation from the ambient (e.g., passive noise reduction (PNR)).

As described in greater detail below, the electronic components of a playback device may include one or more network interface components (not shown in FIG. 4) to facilitate wireless communication over one more communication links. For instance, a playback device may communicate over a first communication link 401*a* (e.g., a BLUETOOTH link) with one of the control devices 130 and/or over a second communication link 401*b* (e.g., a WiFi or cellular link) with one or more other computing devices 410 (e.g., a network router and/or a remote server). As another possibility, a playback device may communicate over multiple communication links, such as the first communication link 401*a* with the control device 130*a* and a third communication link 401*c* (e.g., a WiFi or cellular link) between the control device 130*a* and the one or more other computing devices 410. Thus, the control device 130*a* may function as an intermediary between the playback device and the one or more other computing devices 410, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMD)s

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The microphones 115 are configured to detect sound (i.e., acoustic waves) in the environment of the playback device 110*r*, which is then provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110r may include fewer than six microphones or more than six microphones. The playback device 110r optionally includes an integrated control device 130c. The control device 130c can comprise, for example, a user interface configured to receive user input (e.g., touch input, voice input) without a separate control device. In other embodiments, however, the playback device 110r receives commands from another control device (e.g., the control device 130a of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112a.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Patent Publication No. 2017-0242653.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

FIG. 1H is a partially schematic diagram of one of the control device 130a (FIGS. 1A and 1B). As used herein, the term "control device" can be used interchangeably with "controller," "control device," or "control system." Among other features, the control device 130a is configured to receive user input related to the MPS 100 and, in response, cause one or more devices in the MPS 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the MPS 100. In other embodiments, as described above with respect to FIG. 1G, the control device 130a is integrated into another device in the MPS 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the MPS 100. The memory 132b can comprise data storage that can be loaded with one or more of the software components executable by the processor 302 to perform those functions. The software components 132c can comprise applications and/or other executable software configured to facilitate control of the MPS 100. The memory 112b can be configured to store, for example, the software components 132c, media playback system controller application software, and/or other data associated with the MPS 100 and the user.

The network interface 132d is configured to facilitate network communications between the control device 130a and one or more other devices in the MPS 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.12,802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130a to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1J through 2.

Figure 1I:
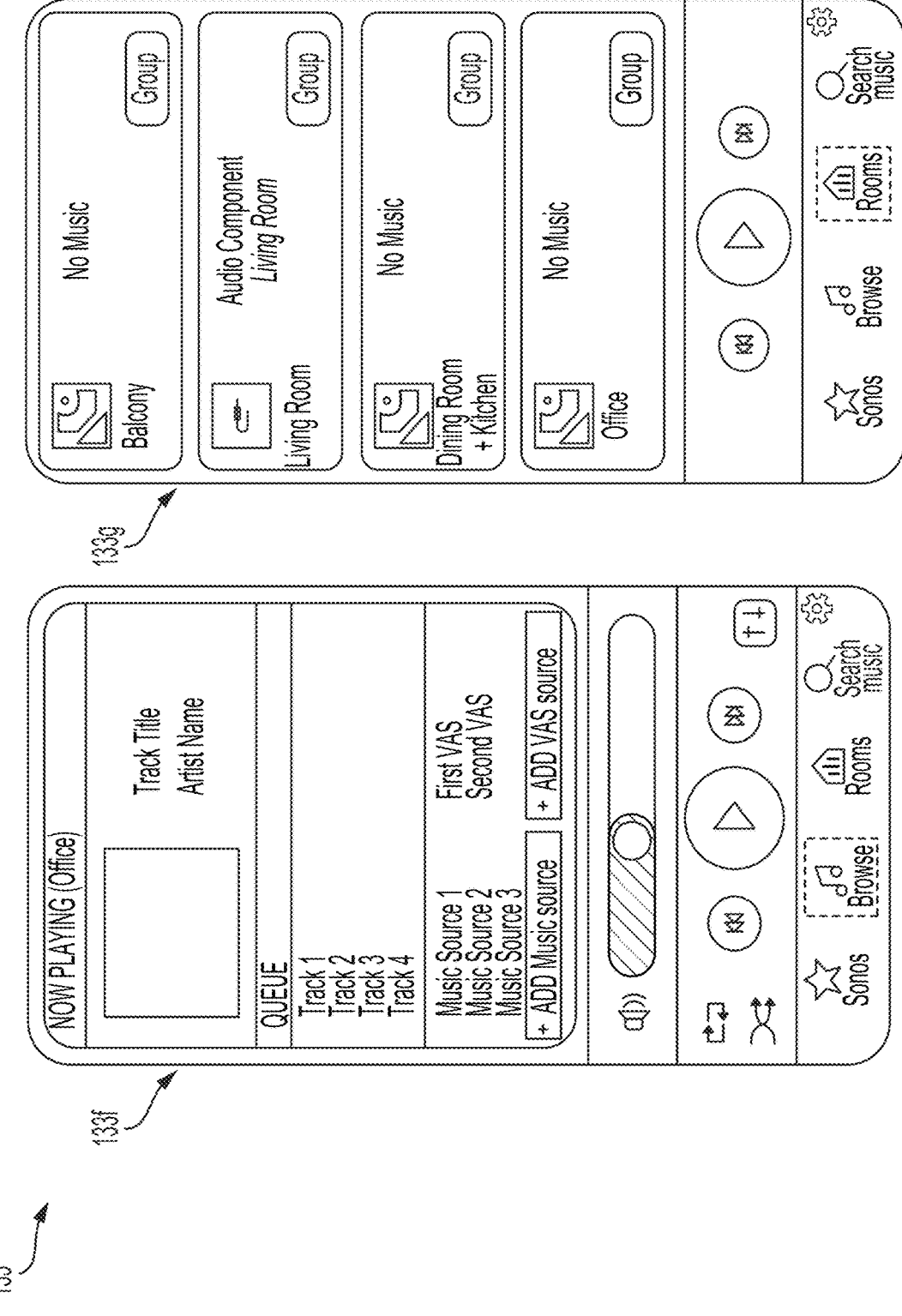
FIG. 1I is a schematic diagram of example user interfaces of the example control device of FIG. 1H.

The user interface 133 is configured to receive user input and can facilitate control of the MPS 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system. FIG. 1I shows two additional user interface displays 133f and 133g of user interface 133. Additional examples are also possible.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 2:
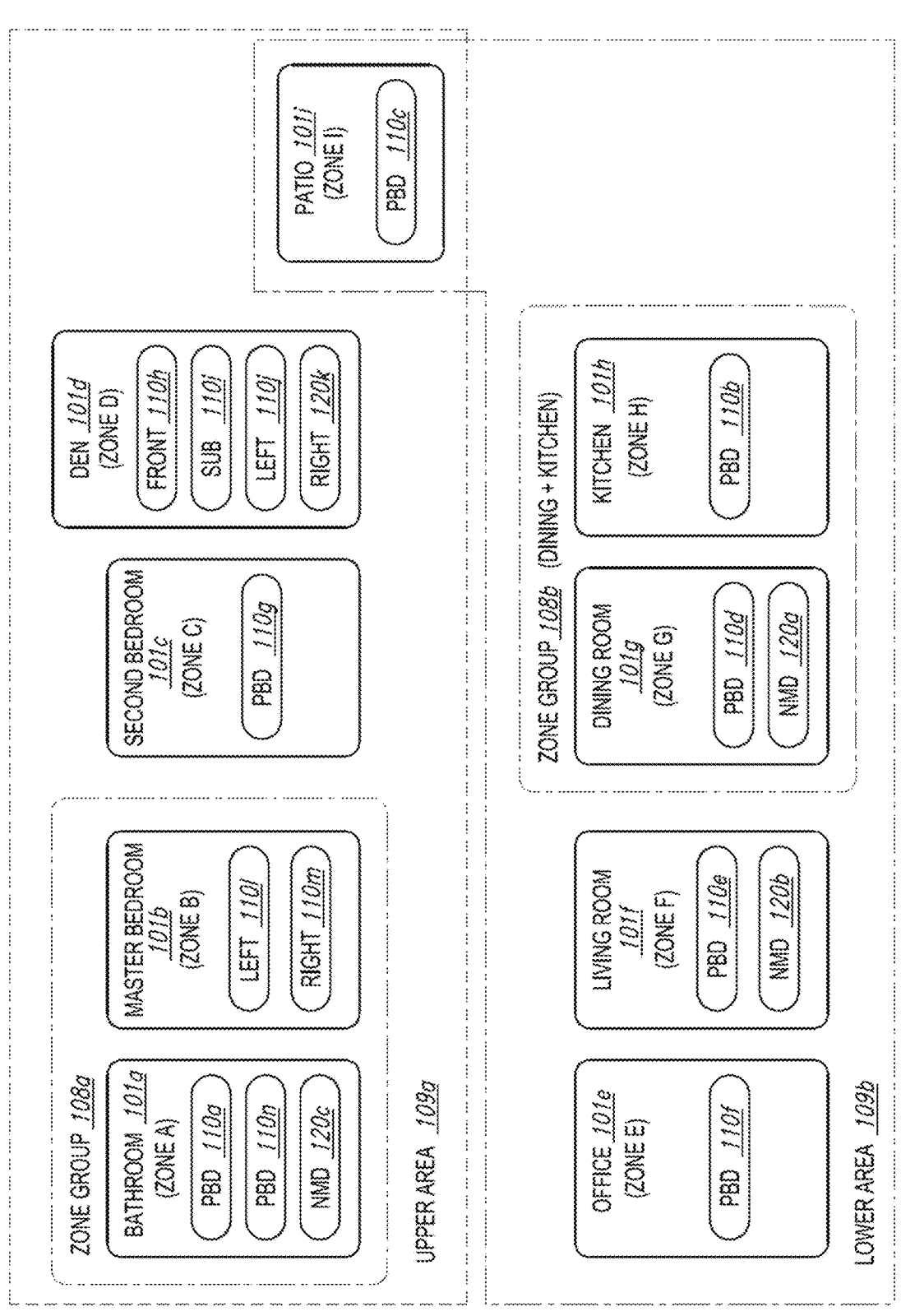
FIG. 2 is a schematic diagram of example media playback system areas.

FIGS. 1J through 2 show example configurations of playback devices in zones and zone groups. Referring first to FIG. 2, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback zones 110g and 110h can be merged to form a merged group or a zone group 108b. The merged playback zones 110g and 110h may not be specifically assigned different playback responsibilities. That is, the merged playback zones 110h and 110i may, aside from playing audio content in synchrony, each play audio content as they would if they were not merged.

Each zone in the MPS 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1J, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1K, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1L shows the Front and SUB devices 110h and 110i further bonded with Left and Right playback devices 110*j* and 110*k*, respectively. In some implementations, the Right and Left devices 110*j* and 110*k* can be configured to form surround or "satellite" channels of a home theater system. The bonded playback devices 110*h*, 110*i*, 110*j*, and 110*k* may form a single Zone D (FIG. 2).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110*a* and 110*n* in the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 2, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 2. In some embodiments, a zone group may be given a unique name selected by a user.

Certain data may be stored in a memory of a playback device (e.g., the memory 112*c* of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1M). Identifiers associated with the Kitchen may indicate the same or similar information by virtue of the Kitchen being part of the Dining+Kitchen zone group 108*b*. Other example zone variables and identifiers are described below.

In yet another example, the MPS 100 may include variables or identifiers representing other associations of zones and zone groups, such as identifiers associated with Areas, as shown in FIG. 2. An area may involve a cluster of zone groups and/or zones not within a zone group. For instance, FIG. 2 shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682, 506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
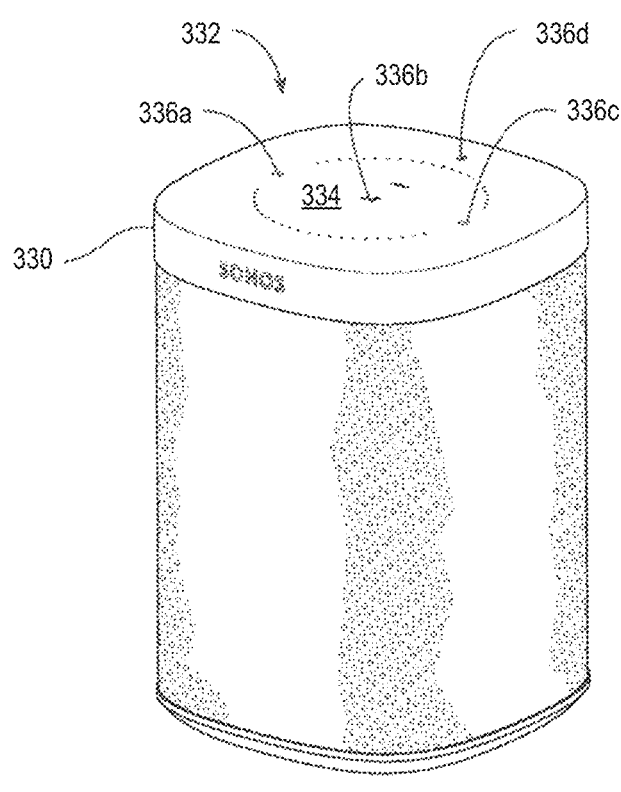
FIG. 3 is an isometric diagram of an example playback device housing.

FIG. 3 shows an example housing 330 of the playback device 110 that includes a user interface in the form of a control area 332 at a top portion 334 of the housing 330. The control area 332 includes buttons 336-c for controlling audio playback, volume level, and other functions. The control area 332 also includes a button 236*d* for toggling the microphones 222 to either an on state or an off state. The control area 332 is at least partially surrounded by apertures formed in the top portion 334 of the housing 330 through which the microphones 222 (not visible in FIG. 3) receive the sound in the environment of the playback device 110. The microphones 222 may be arranged in various positions along and/or within the top portion 334 or other areas of the housing 330 so as to detect sound from one or more directions relative to the playback device 110.

In some embodiments, the playback device 110 may take the form of a wired and/or wireless headphone (e.g., an over-ear headset, an on-ear headset, or an in-ear headset). For instance, FIG. 4 shows an example headset assembly 400 ("headset 400") for such an implementation of the playback device 110. As shown, the headset 400 includes a headband 402 that couples a first earcup 404*a* to a second earcup 404*b*. Each of the earcups 404*a* and 404*b* may house any portion of the electronic components in the playback device 110, such as one or more speakers. Further, one or more of the earcups 404*a* and 404*b* may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406*a* and 406*b* that are coupled to ear cups 404*a* and 404*b*, respectively. The ear cushions 406a and 406b may provide a soft barrier between the head of a user and the earcups 404a and 404b, respectively, to improve user comfort and/or provide acoustic isolation from the ambient (e.g., passive noise reduction (PNR)).

III. Example Media Content Searching Techniques

Figure 5:
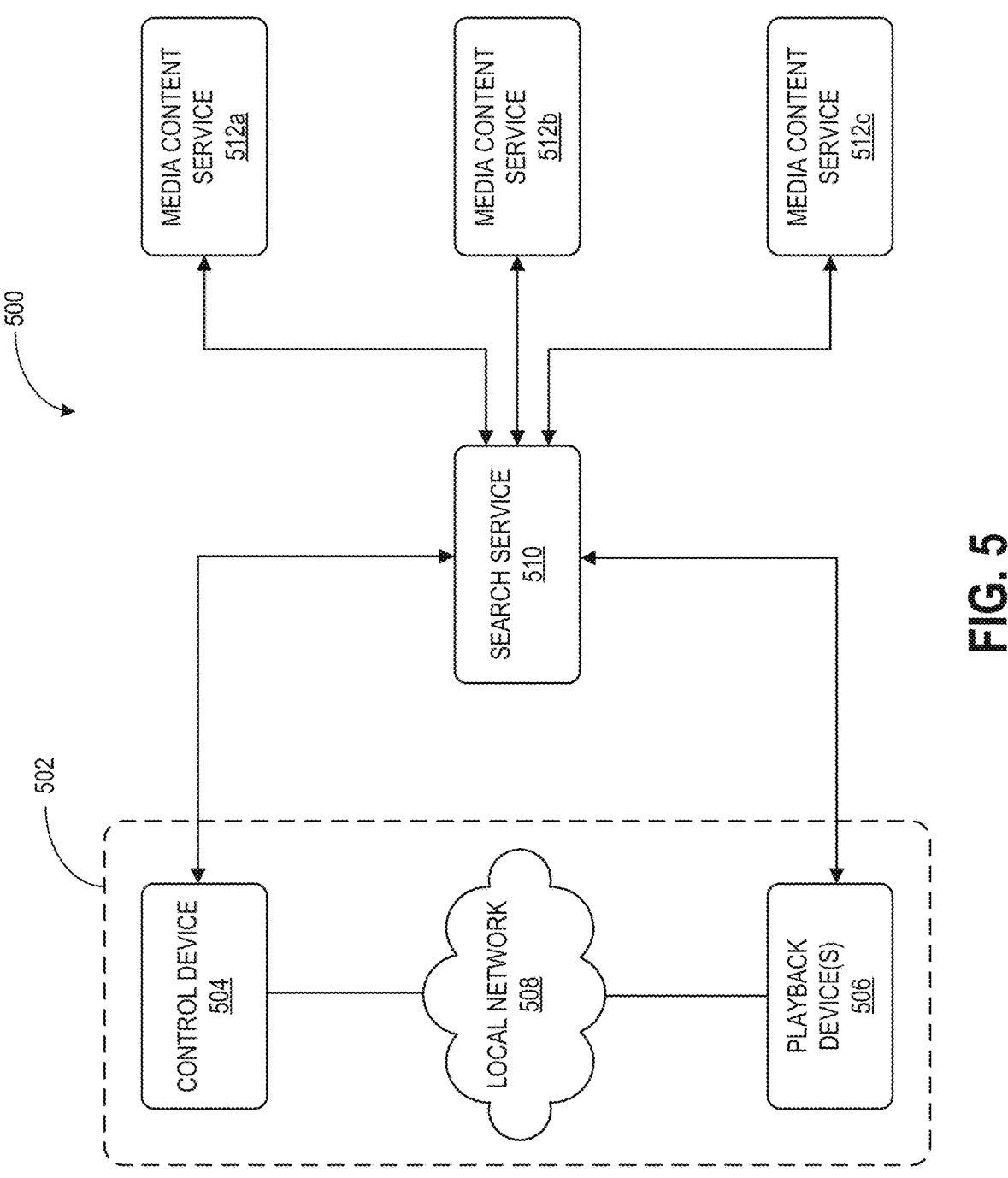
FIG. 5 is a diagram of an example media playback system and associated media content services.

FIG. 5 depicts an example configuration 500 of networked devices. The configuration 500 includes a media playback system 502. Within the media playback system 502 is a control device 504 connected to one or more playback devices 506 over a local network 508. The control device 504 may be the same as, or similar to, the control device 130a described above in connection with FIG. 1H, the playback devices 506 may be the same as, or similar to, the playback device 110a described above in connection with FIG. 1C, and the local network 508 may be the same as, or similar to, the local network 160 described above in connection with FIG. 1B.

As such, in line with the discussion above, the control device 504 may be configured to receive user input related to the media playback system 502, and, in response, cause the playback devices 506 to perform an action corresponding to the user input. The action or operation can be, for example, related to initiating, stopping, or otherwise modifying playback of media content by the playback devices 506. To facilitate this, the control device 504 can include data storage that is loaded with media playback system controller application software, and one or more processors of the control device 504 can execute the controller application software to facilitate receiving the user input and causing the playback devices 506 to perform the corresponding action by sending one or more commands to the playback devices 506 over the local network 508.

As described above in connection with FIG. 1B, the control device 504 may cause the playback devices 506 to play back media content available through one or more media content services, such as media content services 512a-c, associated with the media playback system 502. Examples of media content services include SPOTIFY, APPLE MUSIC, PANDORA, AMAZON MUSIC, and YOUTUBE MUSIC, to name a few. In this regard, the media content services 512a-c may be the same as, or similar to, the media content services 192 described above in connection with FIG. 1B. In practice, the control device 504, by way of the controller application software, may receive user input for searching and selecting media content items offered by the media content services 512a-c. A given media content item may be a media content item that is available for playback, such as a song, an audiobook, or a radio station. Alternatively, a media content item may be a media content item that is not available for playback, such as a profile of an artist or of a media program (e.g., a podcast show), but that, when selected, directs the control device 504 to one or more media content items that are available for playback. For instance, when the media content item is an artist profile, selection of the media content item may direct the control device 504 to one or more media content items corresponding to songs by the artist that are available for playback, and when the media content item is a media program, selection of the media content item may direct the control device 504 to one or more media content items corresponding to episodes of the program that are available for playback. In any case, when the control device 504 receives a selection of a media content item that is available for playback, the control device 504 may cause the playback devices 506 to play back the selected media content item.

To facilitate playback of media content items offered by the media content services 512a-c, the control device 504 and/or the playback devices 506 may be communicatively coupled to a search service 510 over a WAN, such as the Internet. Likewise, the search service 510 may be communicatively coupled to the media content services 512a-c over a WAN, such as the Internet. The search service 510 may include one or more computing devices, which may be the same as, or similar to, the computing devices 106c described above in connection with FIG. 1B. In some examples, the search service 510 may take the form of one or more cloud servers.

The search service 510 may be provisioned with account credentials for the media content services 512a-c. For instance, the control device 504 may receive, as user input, a user's account credentials for each of the media content services 512a-c, and the control device 504 may send the credentials to the search service 510. In some cases, the account credentials may be stored on the control device 504 from when the user previously configured the media playback system to stream content from the media content services 512a-c. In one example, the control device 504 may provide the account credentials to the search service 510 for use when querying the media content services 512a-c. In another example, the search service 510 may store the credentials in a data storage of the search service 510 for use when querying the media content services 512a-c. The search service 510 may then receive, from the control device 504, a search query for a particular media content item, and the search service 510 may use the account credentials (e.g., by obtaining an access token from the media content services 512a-c, etc.) to query the media content services 512a-c for the particular media content item.

In response to receiving a search query from the search service 510, each of the media content services 512a-c may return a number of search results that the media content service has determined to be relevant to the search query. The search results may take various forms. In some examples, a search result may include information identifying metadata (e.g., title, artist, album, track length) associated with a given media content item. The search result may additionally include information for facilitating playback of the media content item. For instance, the search result may include a URI or URL that, when accessed by a playback device, causes the playback device to stream the media content item for playback.

As noted above, conventional search services may be limited in the manner in which they can receive search queries and the manner in which they submit search queries to media content services. Such limitations may stem from requirements imposed by the media content services or by the search service itself. In some examples, a media content service and/or a conventional search service may be configured to receive a search query in a particular format. For instance, a media content service may categorize its media content items into various categories, and the media content service may be configured to receive search queries that specify a particular category to be searched. Examples of categories of media content items include an artist category, a title category, an album category, a playlist category, a media station category, or a podcast category, to name a few. As such, a conventional search service may require any received search query to specify one of these categories, or some other media content item category, in addition to the search term(s).

These limitations of conventional search services may therefore require a user to specify both a search term and a category, which creates additional steps for the user, as this process requires the user to input more information than merely inputting a search term on its own. Additionally, a user may prefer to apply a single search query to multiple categories of media items at once, but these conventional techniques limit search queries and their corresponding search results to a single particular category of media content items. To help address these and other issues, the present disclosure provides systems and methods for searching for media content items offered by multiple media content services that improve upon conventional techniques.

FIG. 6 depicts a flowchart 600 showing example operations for searching for media content items available through multiple media content services. The example operations shown in the flowchart 600 may be performed by a search service, such as the search service 510 depicted in FIG. 5. The example operations are carried out in connection with a controller, such as the control device 504, as well as a first media content service and a second media content service, each of which may be, for example, any of the media content services 512a-c depicted in FIG. 5.

Beginning at block 602, the search service receives a search query from a controller configured to control media playback by one or more playback devices in a media playback system. The media playback system is associated with a plurality of media content services including a first media content service and a second media content service. As noted above, the media playback system may become associated with the media content services by receiving a user's account credentials for the media content services. For instance, the controller may receive the credentials as user input, and the media playback system may store the credentials, such as in a data storage of the search service, for use when retrieving media content items from the media content services.

In order for the search service to receive the search query from the controller, the controller may provide a user interface, by way of the controller application software, through which a user may input the search query. Examples of user interfaces provided by the controller are shown in FIGS. 7A-D, which are explained in further detail below in connection with the flowchart 600. It should be understood that the user interfaces depicted in FIGS. 7A-D are illustrative examples and that variations to these user interfaces that achieve the same functions are contemplated herein as well.

Figure 7A:
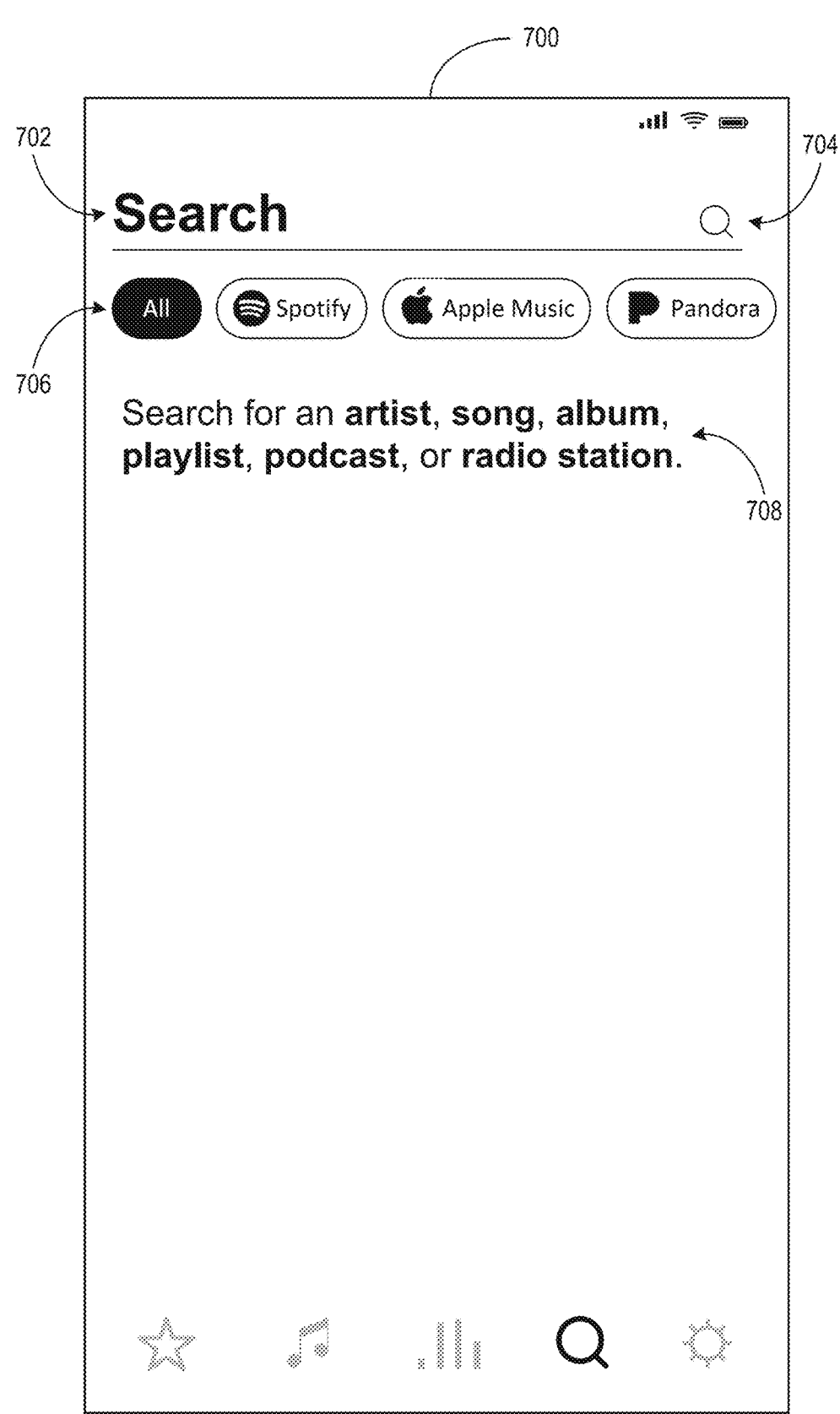
FIG. 7A depicts an example user interface of an example control device.

FIG. 7A depicts a user interface 700 that the controller may display for allowing a user to input a search query into the controller. As shown, the user interface 700 includes a text field 702 where the user may enter one or more search terms. The interface 700 further includes a search command button 704, which the user may select to initiate a search query that includes the search terms entered into the text field 702. Upon selection of the search command button 704, the controller may send a search query, including the entered search terms, to the search service.

As further shown in FIG. 7A, the interface 700 includes selectable media content service options 706 for customizing which media content service(s) to query when sending the search query. As depicted, the selectable media content service options 706 may include options for selecting a subset of the media content services (e.g., selecting one or two individual media content services) or for selecting all of the media content services. When sending the search query to the search service, the controller may specify which media content service(s) the search query is directed to based on the selectable media content service options 706 that the user has selected. The controller may send this information as part of the search query or as an indication separate from the search query.

Additionally, the interface 700 includes a prompt 708 for notifying the user as to the categories of media content items that are available to be searched. The controller may be configured to vary the categories included in the prompt based on the media content services that are to receive the search query. A given media content service may have a predefined set of categories of media content items that can be searched. The search service may determine the set of searchable categories for each media content service. For instance, the search service may receive, from each media content service associated with the media playback system, information identifying the predefined set of searchable categories for the media content service. The search service may send the information identifying the predefined set of searchable categories to the controller, and the controller may use the information to customize the prompt 708. In some examples, the controller may cause the prompt 708 to list some or all of the searchable categories of media content items for all of the media content services associated with the media playback system. In other examples, the controller may cause the prompt 708 to only list the searchable categories for the media content service(s) that the user has selected from among the selectable media content service options 706.

Returning to FIG. 6, at block 604, once the search service has received the search query from the controller, the search service generates a number of additional search queries for the media content services based on the search query received from the controller. As noted above, the media content services may require search queries to specify a category of media content items to be searched. However, as further noted above, limiting a search query to a single category of media content items may result in a restrictive user experience. Accordingly, to address this issue, the search service may generate multiple queries for each media content service, where the multiple queries correspond to the multiple searchable categories of the media content service. For instance, in response to receiving a search query including a search term from the controller, the search service may generate a first additional search query that identifies the search term and a first category of media content items (e.g., the artist category), a second additional search query that identifies the search term and a second category of media content items (e.g., the title category), a third additional search query that identifies the search term and a third category of media content items (e.g., the album category), and so on.

The search service may generate such additional search queries for each media content service specified by the user through the selectable media content service options 706. In this regard, the search service generates (i) a first plurality of additional search queries corresponding to a first plurality of categories of media content items and (ii) a second plurality of additional search queries corresponding to a second plurality of categories of media content items. The search service may tailor the additional search queries for the media content service they are directed to. For instance, different media content services may support searches of different categories of media content items. As such, based on determining the searchable categories of media content items for each media content service as described above, the search service may generate additional search queries that correspond to those determined categories. Thus, in some examples, the first plurality of additional search queries may include a subset of search queries identifying categories of media content items that do not match any of the categories of media content items identified by the second plurality of additional search queries, and vice versa.

At block 606, once the search service has generated the additional search queries for each selected media content service, the search service sends the additional search queries to the selected media content services. Accordingly, the search service sends the first plurality of additional search queries to the first media content service, and the search service sends the second plurality of additional search queries to the second media content service.

At blocks 608 and 610, the search service receives search results from the media content services based on the additional search queries sent to the media content services. The search service may receive the search results as separate subsets of search results with each subset corresponding to one of the additional search queries. For instance, in response to a first additional search query that identifies a first category of media content items (e.g., the artist category), the search service may receive a first subset of search results identifying media content items within the identified first category; in response to a second additional search query that identifies a second category of media content items (e.g., the title category), the search service may receive a second subset of search results identifying media content items within the identified second category; and so on.

In this manner, at block 608, based on the first plurality of additional search queries, the search service receives, from the first media content service, a first set of search results comprising a first plurality of subsets of search results, each subset of search results from among the first plurality of subsets of search results corresponding to a respective category of media content items from among the first plurality of categories of media content items. And at block 610, based on the second plurality of additional search queries, the search service receives, from the second media content service, a second set of search results comprising a second plurality of subsets of search results, each subset of search results from among the second plurality of subsets of search results corresponding to a respective category of media content items from among the second plurality of categories of media content items.

At block 612, the search service aggregates the search results received from the various media content services. As such, the search service aggregates the first set of search results and the second set of search results into an aggregated set of search results. When aggregating the results, the search service may do so in a manner that organizes the results in a way that will be useful to a user when the controller displays the results. For instance, the search service may aggregate the search results such that the search results are organized based on (i) the categories of media content items corresponding to the search results and (ii) the media content services from which the search service receives the results.

FIG. 8 depicts an example of how the search service may aggregate the various received search results into an aggregated set of search results 800. As shown, the search service may create an initial grouping of search results by their corresponding categories of media content items. For instance, the search service may group all search results from the media content services that correspond to "CATEGORY A" into a first subset of search results, all search results from the media content services that correspond to "CATEGORY B" into a second subset of search results, and so on.

When grouping the search results by their corresponding categories, the search service may be configured to position the categories in a certain order relative to one another. In some examples, the search service may position the categories in a predefined order. For example, the search service may be configured to position the artist category first, followed by the title category, followed by the album category, and so on. However, it may be desirable to order the categories instead based on relevancy. For instance, the search service may be configured to determine a category that is most likely to return a relevant result to the search query and position that category before others. In some examples, the most relevant category may be the category having the most returned search results. As such, the search service may be configured to evaluate the search results returned by the media content services to determine the number of search results associated with each category and rank the categories based on their number of search results, such as in descending order. Additional examples of how the search service may order the categories will be explained in further detail below.

Within each subset of search results, the search service may organize the search results based on the media content service that provided the search result. For instance, the search service may be configured to prioritize one media content service over another by positioning one or more results from the prioritized media content service before one or more results from another media content service. The search service may determine the priority of the media content services in various ways. In some examples, the controller may receive user input (e.g., via a settings menu) specifying a particular media content service as a preferred service or ranking the priorities of the media content services associated with the media playback system. The controller may send this information to the search service, and the search service may use this information to determine the priorities of the media content services. In other examples, the search service may determine the priority of the media content services based on an extent to which a user engages with each media content service. As one example, the search service may determine how many search queries specifying each media content service that the search service has received from the controller and prioritize the media content service with the most search queries. As another example, the controller or the search service may determine how many media content items the user has played or otherwise accessed through each media content service and prioritize the media content service with the most played or accessed media content items. Other examples are possible as well.

In some examples, the search service may interleave the search results from the various media content services and may do so based on how the media content services rank the search results. The media content services may be configured to provide the search results to the search service in a particular order, such as an order based on relevancy so that the first search result has the highest relevancy (as determined by the media content service), the second search result has the next highest relevancy, and so on. In order to present the most relevant search results in a prominent position for improving user experience, when aggregating the search results the search service may interleave the search results from the various media content services so that the first search results (e.g., those having the highest relevancy scores) from each media content service are positioned before subsequent search results from the media content services. For instance, the search service may interleave all of the first search results from the media content services together, followed by all of the second search results, and so on.

When interleaving the search results, the search service may prioritize a particular media content service over another by again positioning the interleaved results from the particular media content service before the interleaved results from the other media content services. Further, the search service may additionally prioritize a particular media content service by interleaving search results from the prioritized service at a higher rate. To illustrate, consider the example shown in FIG. 8, in which a "$1^{ST}$ MEDIA CONTENT SERVICE" is preferred over a "$2^{ND}$ MEDIA CONTENT SERVICE" and a "$3^{RD}$ MEDIA CONTENT SERVICE." As shown, instead of organizing the search results in a way that alternates between media content services after each result, the search service may position both the first and second search results from the preferred media content service consecutively before the first search results from the other media content services. And for the remaining search results, the search service may interleave the search results in a way that alternates between media content services after each result. However, it should be understood that these examples are for illustrative purposes only, and the search service may organize the search results in various other ways that prioritize one or more media content services over one or more other media content services.

Using the techniques described above in connection with FIG. 6 may cause a large amount of traffic between the search service 510 and the media content services 520. For instance, a single user-initiated search query may prompt the search service 510 to generate multiple separate category-based search queries sent to each of the media content services 520. Likewise, each of the media content services 520 may then respond to each of the multiple separate category-based search queries, further exacerbating the traffic.

To help reduce the number of messages sent between the search service 510 and the media content services 520 and lighten the traffic load, the search service 510, in some examples, can be configured to generate and send a single "all" search query to one or more of the media content services 520 that support such a query instead of generating and sending multiple different category-based search queries. For instance, in response to receiving a search query including a search term from the controller, the search service 510 may generate an all-categories search query that identifies the search term and the "all" category of media content items. The search service 510 may then send the generated all-categories search query to any of the media content services 520 that support such a query. In response to receiving the all-categories search query, a media content service 520 may return a set of search results that includes search results from any and all categories of media content offered by the media content service 520, and within the set of search results, each separate search result may be associated with data identifying the respective category of the search result. Upon receiving the set of search results, the search service 510 may then aggregate the search results in the manner described above.

Returning to FIG. 6, at block 614, the search service sends the aggregated set of search results to the controller for display to a user. When displaying the results, the controller may be configured to display the results in the order defined by the aggregated set of search results.

Figure 7B:
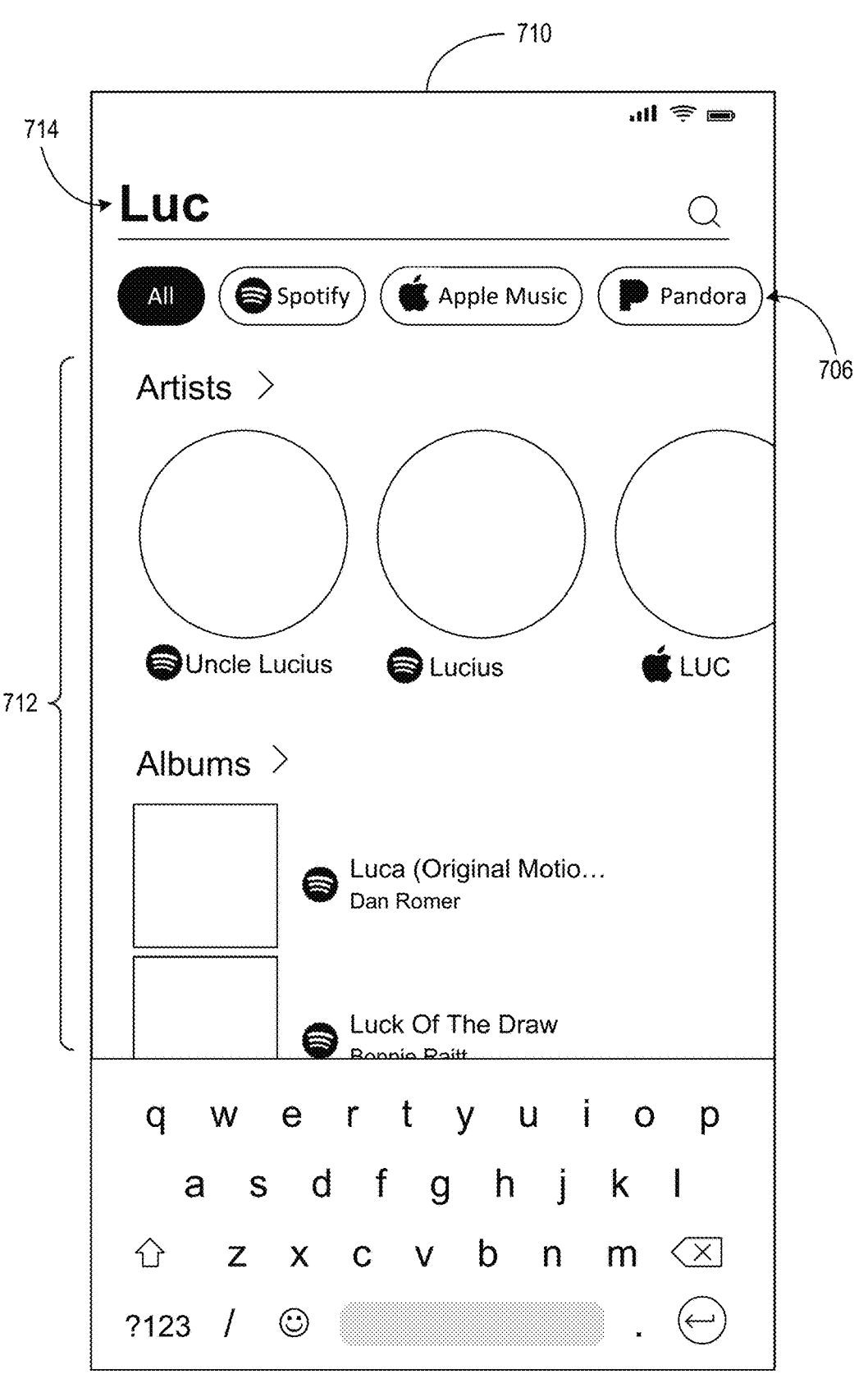
FIG. 7B depicts another example user interface of the example control device.
Figure 7C:
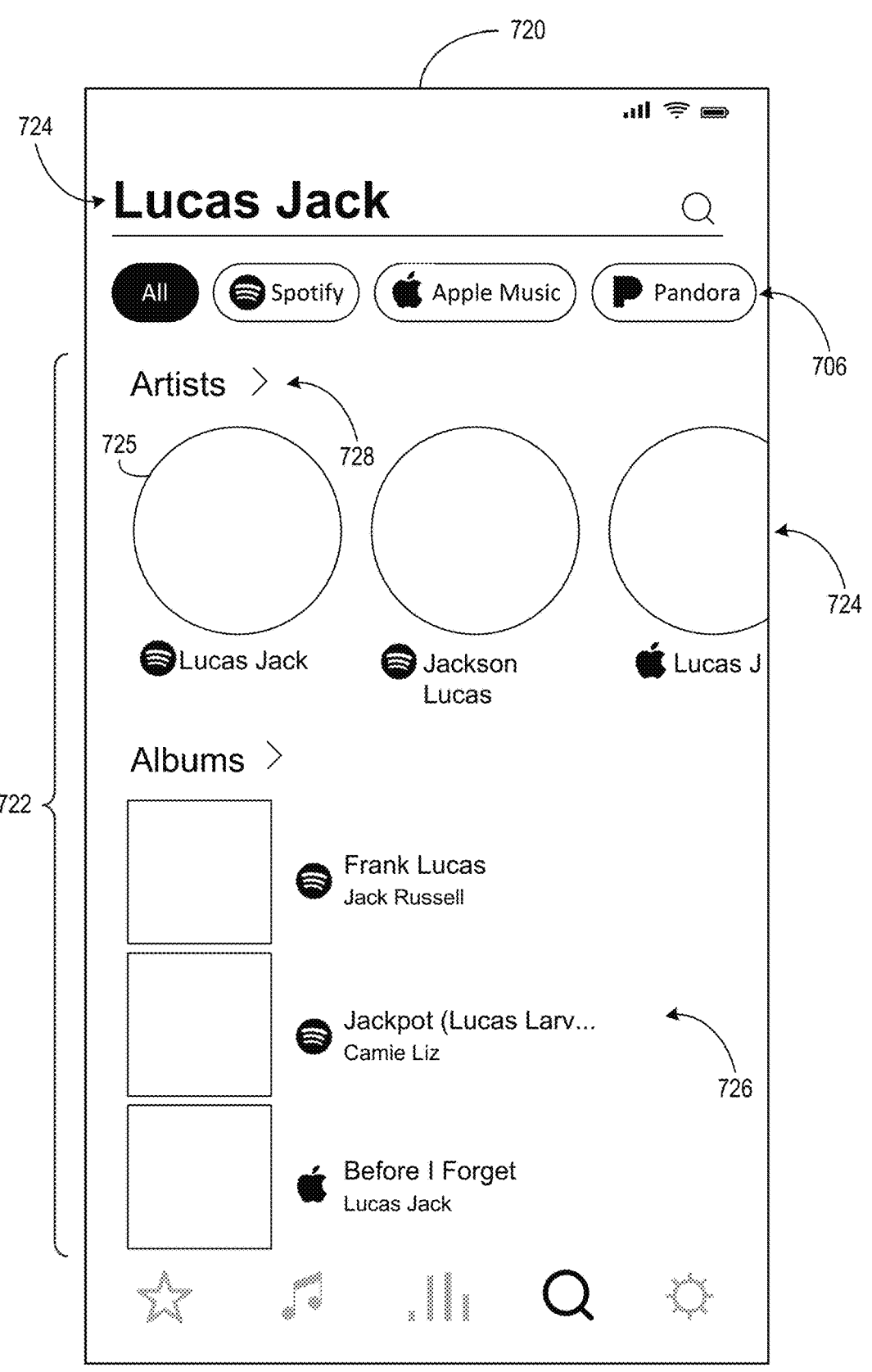
FIG. 7C depicts another example user interface of the example control device.

FIGS. 7B and 7C depict example user interfaces 710, 720 that the controller may display when presenting the search results to a user. The user interface 710 depicted in FIG. 7B includes displayed search results 712 based on a partial search term 714. When receiving user input via the text field 702 depicted in FIG. 7A, the controller may be configured to send one or more intermediate search queries to the search service based on the partial search term 714. In some examples, the controller may send an intermediate search query every time the user inputs an additional character into the text field 702. In other examples, the controller may send an intermediate search query when a user enters a character into the text field 702 and a predetermined amount of time elapses without a subsequent character being entered into the text field 702. In any case, when the controller sends an intermediate search query to the search service, the search service may treat the intermediate search query in the same manner as a complete search query by generating additional queries for the media content services, obtaining search results from the media content services, aggregating the search results, and providing the search results to the controller in the manner described above in connection with FIG. 6. While submitting intermediate search queries in this manner may consume additional computational resources of the controller, the search service, and the media content services, doing so may provide an improved user experience by potentially reducing the amount of user input required to obtain a desired search result.

The user interface 720 depicted in FIG. 7C includes displayed search results 722 based on a complete search term 724. In line with the discussion above, the controller displays the search results 722 in the order defined by the aggregated set of search results received from the search service. Thus, as shown, the displayed search results 722 are grouped according to their corresponding categories of media content items. For instance, the displayed search results 722 include a first grouping of search results 724 for the artist category and a second grouping of search results 726 for the album category. Further, within each of the category-based groupings, the displayed search results 722 are ordered based on the media content service that returned the results. In the illustrated example, the search service has identified Spotify as the preferred media content service, so each of the category-based groupings in the displayed search results 722 include the first two results from Spotify before interleaving results from the other media content services associated with the media playback system.

As further shown in FIGS. 7B and 7C, the controller may be configured to display search results in different formats based on the category-based grouping of the search results. For instance, the controller may be configured to display the first category-based grouping of search results in a more prominent manner than other category-based groupings. In the illustrated examples, the controller displays the first category-based grouping of search results, which is the artist category in the present example, in a larger size and in a single row grid format, which may also be referred to as a horizontal swimlane format. The controller displays the second category-based grouping of search results in a smaller size and in a carousel format. However, these examples are for illustrative purposes only, and the controller may apply various other formats to the different category-based groupings of search results.

The interface 720 may further include selectable list expansion elements 728 for expanding the displayed search results for any given category. In response to receiving a user input selecting the list expansion element 728 for the artist category, the controller may display the example interface 730 depicted in FIG. 7D. As shown, the interface 730 displays only the search results from the category corresponding to the selected list expansion element 728, which is the artist category in the present example. The interface 730 includes a selectable return element 732 for returning to the interface 720 displaying search results corresponding to multiple categories.

Figure 7D:
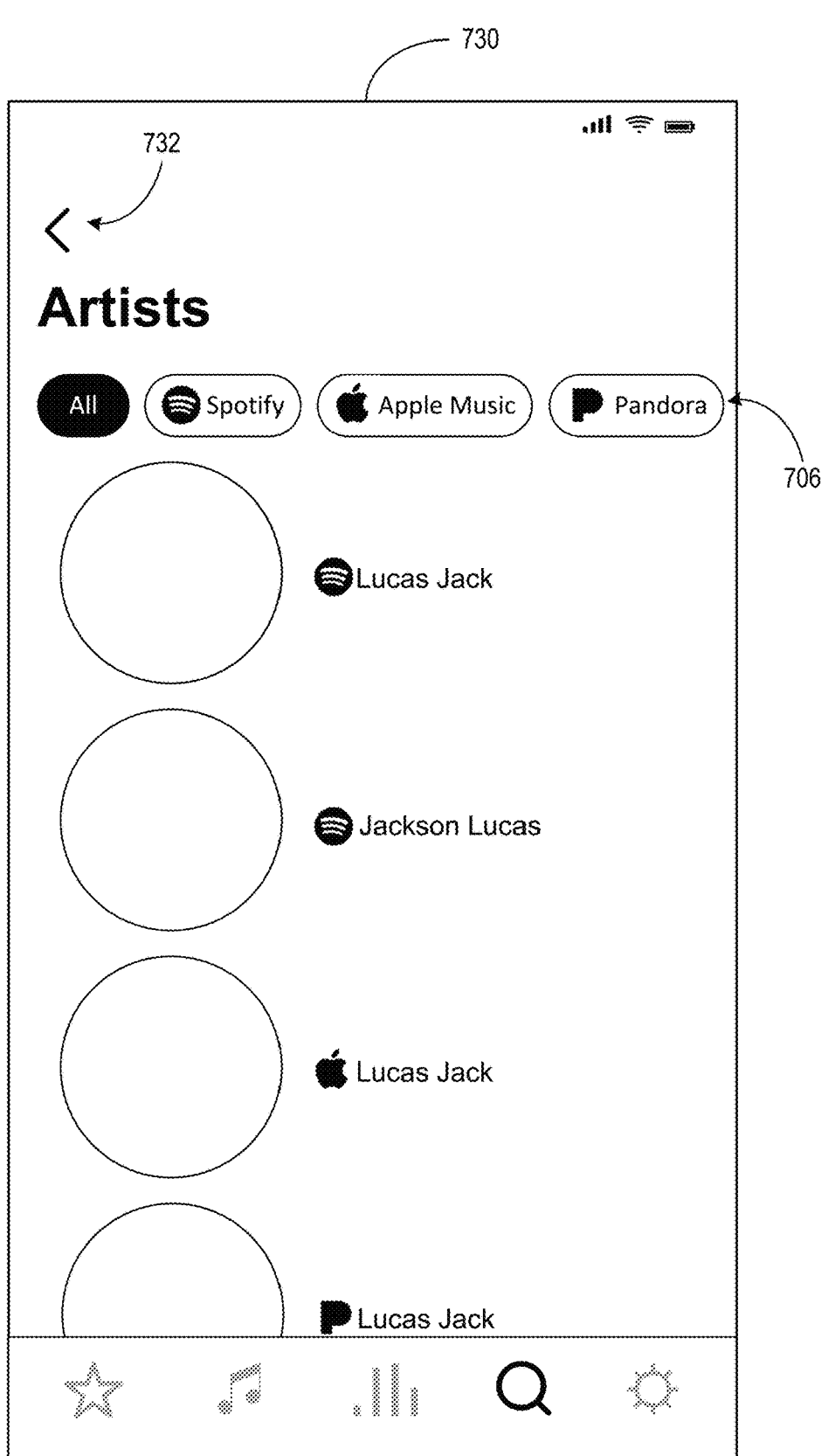
FIG. 7D depicts another example user interface of the example control device.

Further, each of the interfaces depicted in FIGS. 7B-D include the selectable media content service options 706. Upon selection of one of the options 706, the controller can take steps to update the displayed search results accordingly. In some examples, the controller may initiate a new search query in response to receiving a selection of one of the media content service options 706. When sending the new search query to the search service, the controller may specify only the selected media content service as the target for the search query. The search service can then query the selected media content service and return the results in the manner described above. However, in other examples, the controller may update the displayed search results without initiating a new query. For instance, if the "All" option is selected, and the user selects one of the other options corresponding to a particular media content service, then the controller does not need to initiate a new query because the controller has already received search results from all of the media content services. Instead, the controller can identify the search results corresponding to the selected media content service, include the identified search results in the displayed interface, and exclude the remaining search results from the displayed interface. In this manner, the controller may filter the aggregated search results according to the selected media content service options 706.

Additionally, as noted above, the search results may include information for facilitating playback of media content items corresponding to the search results, such as URIs or URLs for accessing and streaming the media content items. As such, when the controller displays representations of the search results, such as by displaying the interfaces depicted in FIGS. 7B-D, the controller can receive user input of a selection of one of the search results and, in response to receiving the user input, cause one or more playback devices of the media playback system to playback the media content item corresponding to the selected search result. For instance, the controller may send the URI or URL associated with the selected search result to one or more playback devices in the media playback system, and the playback device(s) may play back the corresponding media content by accessing the URI or URL received from the controller. In other examples, the controller may send an indication of the selected search result to the search service, and the search service may responsively send the URI or URL associated with the selected search result to one or more playback devices in the media playback system.

While the examples described above may provide an improved user experience by allowing a user to search for media content items across multiple media content services without subjecting the user to rigid search formats, there may still be room for further improvement. For example, the user experience may be further improved by providing search results that are customized based on a user's history of media consumption and interaction with search results. Additionally, because the examples described above involve sending multiple queries to multiple media content services, there may be a noticeable delay between when a user submits a query and when the results are displayed by the controller. Thus, any improvement to the search speed may be desirable as well.

Figure 9:
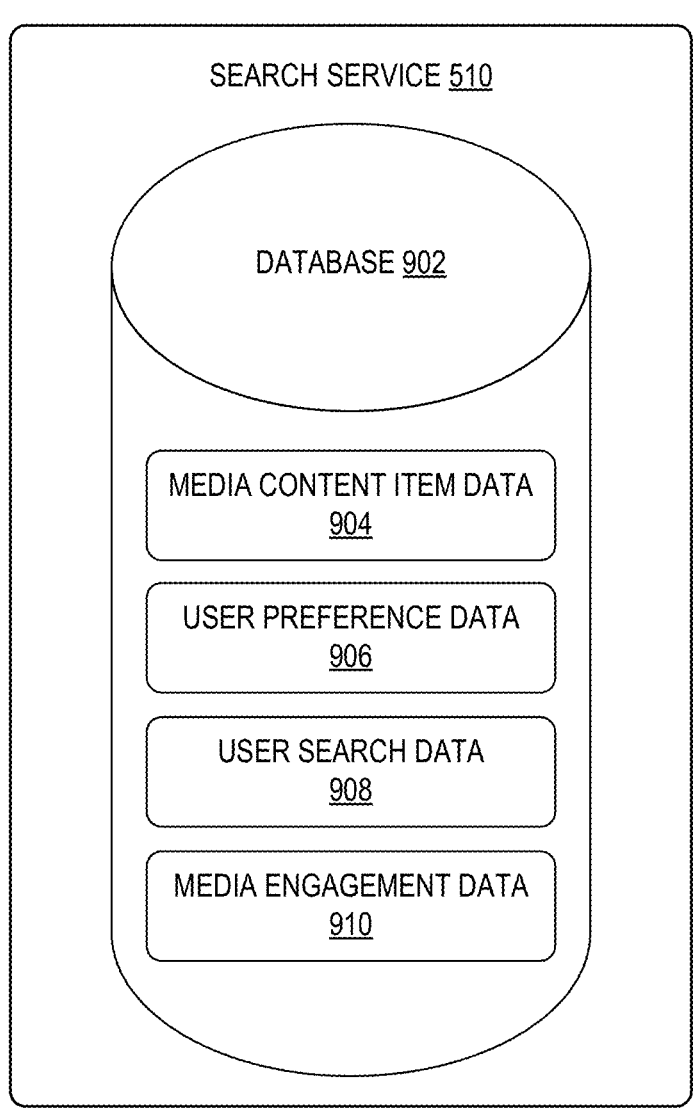
FIG. 9 is a diagram of an example search service.

To help provide these additional improvements, the search service 510 may be configured to maintain a database in which various media content information and user information can be stored. FIG. 9 depicts an example database 902 of the search service 510. As shown, the database 902 includes media content item data 904, user preference data 906, user search data 908, and media engagement data 910.

The media content item data 904 can include some or all of the data that each of the media content services store in association with media content items. For instance, in connection with any given media content item that is available for playback through any of the media content services, the search service 510 may store various metadata that characterizes the media content item. Examples of such metadata may include artist, title, album, track length, or genre information, as well as information identifying the media content services that offer playback of the media content item. Additionally, the search service 510 may store information for accessing the given media content item through each of the media content services that offer playback of the media content item. In line with the discussion above, such information may include URIs or URLs for each of the media content services that offer playback of the media content item. Further, because the search service 510 is configured to search the media content item data 904 as described in further detail below, the search service 510 may index the media content item data 904 to provide for faster searching of the media content item data 904.

The search service 510 may maintain the media content item data 904 by comparing the media content item data 904 to corresponding data received from the media content services 512*a-c* and updating the media content item data 904 to correct any discrepancies. For instance, when the search service 510 receives a search query from a controller and submits corresponding searches to the media content services 512*a-c*, such as by performing the process described above in connection with FIG. 6, the search service 510 may compare the search result data received from the media content services 512*a-c* to the media content item data 904 in the database 902. If the search service 510 determines that the database 902 is missing media content item data 904 for a given search result, or that the media content item data 904 corresponding to a particular media content item is inconsistent with the search result data received from the media content services 512*a-c,* then the search service 510 may update the media content item data 904 to add the missing data or correct the inconsistent data.

The search service 510 may initially build the media content item data 904 in various ways. In some examples, the search service 510 gradually builds the media content item data 904 based on data received from the media content services 512*a-c* based on user-initiated search queries, similar to how the search service 510 maintains the media content item data 904, as described above. In other examples, the search service 510 builds the media content item data 904 more quickly by initiating a mass download of media content item data from each of the media content services 512*a-c*. The media content services 512*a-c* may be configured to facilitate such a mass download based on a request from the search service 510. Alternatively, the search service 510 may simulate such a mass download by generating and submitting to one or more of the media content services 512*a-c* a set of simulated search queries designed to obtain a partial or full representation of the media content items available through the media content services 512a-c.

The user preference data 906 may include various user preferences specified by a user explicitly or implicitly, in connection with searching for media content items. Explicitly specifying user preferences may involve a user entering or selecting preference settings within the controller application, and implicitly specifying user preferences may involve the controller and/or the search service determining preference settings based on user activity, such as determining a preferred media content service based on how often the user accesses media content items through a particular media content service. Examples of user preference data may include information specifying a preferred media content service or a ranking of media content services for use in organizing the aggregated search results in the manner described above. In some examples, the user preference data 906 may specify a preferred media content service on a category-by-category basis. For instance, the user preference data 906 may specify one preferred media content service for listening to albums or individual songs, and the user preference data 906 may specify a different preferred media content service for listening to podcasts or audiobooks.

The user search data 908 may include data that identifies a user's interaction with search results when performing searches using the search service 510. When a controller displays a set of search results using any of the techniques described herein, the controller may detect how a user interacts with the displayed search results and send information characterizing the user's interactions to the search service 510. As one example, the controller may detect that, while the controller displays a set of search results, the controller receives a selection of a particular search result or a particular category of media content items. For instance, in the example depicted in FIG. 7C, while the controller displays search results 722 for the search query "Lucas Jack," the controller may detect a selection of search result 725, which corresponds to an artist-category search result received from Spotify. The controller may send information to the search service 510 indicating one or more of the search query (e.g., "Lucas Jack"), the media content service that provided the selected search result (e.g., Spotify), and the category of media content item associated with the selected search query (e.g., artist).

As the search service 510 accumulates more and more user search data 908, the search service 510 may leverage the search data 908 to improve the relevancy of the search results returned to the controller for both individual users and for the entire population of users as a whole (e.g., across different media playback systems). For example, the search service 510 may access the user search data 908 to determine an extent to which a given user selects search results from a particular media content service and, based on that determination, identify the particular media content service as a preferred media content service for the purpose of organizing search results in the manner described above. As another example, when the user search data 908 is lacking for a particular user (e.g., a new user that has not yet submitted a sufficient number of search queries from which preferences can be inferred), the search service 510 may leverage the search data 908 from other users, such as the entire population of users, or subset of the entire population according to one or more demographic data, to infer preferences for the particular user. For instance, the search service 510 may determine, based on the user search data 908, that the entire population of users uses a particular media content service more than others, and, based on that determination, the search service 510 may identify the particular media content service as the particular user's preferred media content service for the purpose of organizing search results in the manner described above. Additionally, the search service 510 may leverage data for the entire population of users in a similar manner for not just the search data 908, but any of the other user-based data stored in the database 902 as well. As another example, the search service 510 may use the user search data 908 to determine a likelihood that a given search query corresponds to a particular category of media content items and use that determination to organize the search results in a more relevant arrangement. For instance, if the search service 510 determines from the user search data 908 that a threshold number of users who submit the search query "Lucas Jack" select a search result from the artist category of media content items, then the search service 510 may infer that "Lucas Jack" is an artist and that a user submitting this query likely desires search results that fall within the artist category. As such, when aggregating search results from the media content services 512 based on the search query "Lucas Jack," the search service 510 may prioritize search results within the artist category by positioning them before search results in other categories.

The media engagement data 910 may include data that identifies how users have engaged with various media content items or various media content services. The controller may be configured to determine, by way of the controller software application, the various media content items that a user selects for playback by the media playback system, as well as the particular media content services that the user chooses when doing so. The controller may send this data to the search service 510, and the search service 510 may store this data as media engagement data 910. Similar to how the search service 510 may make use of the user search data 908, the search service 510 may access the media engagement data 910 to determine an extent to which a given user uses a particular media content service and/or the categories of media content items the user accesses through each media content service. Based on these usage determinations, the search service 510 may identify a particular media content service as an overall preferred media content service or as a preferred media content service for a particular category of media content items. When aggregating search results from the media content services 512, the search service 510 may then position search results from the preferred media content service before search results from other media content services in the manner described above.

The search service 510 may use the media engagement data 910 in various other ways as well. For example, the search service 510 may use the media engagement data 910 to determine recommended media content items for a given user. The search service 510 may compare the media engagement data 910 for multiple different users to identify another user that has similar media engagement patterns to the given user. The search service 510 may then identify one or more additional media items that the similar user has engaged with and send an indication of the identified media items to the controller. The controller may then recommend the identified media items to the user by displaying a representation of the identified media items in a user interface. Other examples are possible as well.

FIG. 10 depicts a flowchart 1000 showing example operations for searching for media content items available through multiple media content services. The example operations shown in the flowchart 1000 may be performed by a search service, such as the search service 510 depicted in FIGS. 5 and 9. The example operations are carried out in connection with a controller, such as the control device 504, as well as a first media content service and a second media content service, each of which may be, for example, any of the media content services 512*a-c* depicted in FIG. 5.

Beginning at block 1002, the search service receives a search query from a controller configured to control media playback by one or more playback devices in a media playback system that is associated with a plurality of media content services including a first media content service and a second media content service. The search service may receive the search query in a manner that is the same, or similar to, the manner described above in connection with block 602 of FIG. 6.

At block 1004, the search service accesses a database comprising a plurality of media content item identifiers corresponding to media content items available through the plurality of media content services. Each media content item identifier is associated with a respective category of media content items from among a plurality of categories of media content items. In line with the discussion above in connection with FIG. 9, the database 902 may be a database including media content item data 904 that the search service has previously populated and maintains by comparison with search results received from the media content services. Further in line with the discussion above, the media content item identifiers may include various data within the media content item data 904 that identifies the media content items available through the plurality of media content services. As one example, each media content item identifier may include metadata associated with a corresponding media content item. As another example, each media content item identifier may include a URI or URL at which a corresponding media content item can be streamed for playback. As yet another example, each media content item identifier may include a distinct set of characters similar to a serial number.

At block 1006, based on the search query, the search service identifies in the database (i) a first set of media content item identifiers corresponding to media content items available through the first media service and (ii) a second set of media content item identifiers corresponding to media content items available through the second media content service. When searching the database for media content item identifiers that match the search query, the search service may use any searching techniques now known or later developed. Because the search service uses search data from the media content services to populate and maintain the database, searching the database may provide similar or identical results as those that would be obtained by submitting search queries to the media content services themselves, such as in the manner described above in connection with FIG. 6. Additionally, because the database includes media content item data for media content items available through the multiple media content services, the search engine may effectively search all of the multiple media content services by carrying out a single search on the database instead of generating and sending multiple search queries to each media content service. This may result in faster searches and an improved user experience.

At block 1008, the search service aggregates the first set of media content item identifiers and the second set of media content item identifiers into an aggregated set of media content item identifiers such that respective media content item identifiers in the aggregated set of media content item identifiers are organized based on (i) the categories of media content items corresponding to the respective media content item identifiers and (ii) the media content services through which the media content items corresponding to the respective media content item identifiers are available. When aggregating the media content item identifiers, the search service may do so in a manner that is the same, or similar to, the manner described above in connection with block 612 of FIG. 6.

At block 1010, the search service sends the aggregated set of media content item identifiers to the controller for display to a user. When displaying the results, the controller may be configured to display the results in the order defined by the aggregated set of search results.

In any of the examples described herein that involve organizing search results or media content item identifiers in a particular order, or that involve filtering out search results or media content items identifiers from one or more media content services (e.g., based on the selectable media content service options 706), the organizing and/or the filtering may be performed entirely by the search service, entirely by the controller, or by any combination of the search service and the controller.

In some examples, when performing the operations shown in FIG. 10, even though the search service may be able to identify relevant media content item identifiers by searching only the database, resulting the relatively faster presentation of search results to the user, the search service may nonetheless continue to query the media content services to verify that the data in the database is accurate. For instance, based on the search query received from the controller, the search service may generate additional search queries for the media content services in the manner described above in connection with FIG. 6, in parallel or after the initial database-focused search results are already displayed on the controller. The search service may send the search queries to the media content services and receive search results corresponding to the queries. In line with the discussion above in connection with FIG. 9, the search service may compare the received search result data with corresponding data in the database to determine whether the data in the database is consistent with the search result data. If the search service identifies any inconsistencies, then the search service may update the database to correct the inconsistencies, and the search service may additionally send updated media content identifiers to the controller, if appropriate, which may cause the controller to update the initially displayed search results.

In some examples, when searching the database based on the search query at block 1006, the search service may identify one or more media content item identifiers that correspond to media content items available through a media content service that is not associated with the media playback system (e.g., a media content service for which the media playback system has not received and stored user credentials). For instance, as noted above, the search service may store data identifying which media content services are associated with the media playback system. And as further noted above, the media content item data 904 may include data identifying which media content service each media content item identifier is associated with. Accordingly, when searching the database, the search service may compare the data identifying which media content services are associated with the media playback system with the data identifying which media content service each media content item identifier is associated with to determine whether an identified media content item is available through a media content service that is not associated with the media playback system.

When the search service identifies, based on searching the database at block 1006, one or more media content item identifiers that correspond to media content items available through a media content service that is not associated with the media playback system, the search service may include these one or more media content item identifiers in the aggregated set of media content identifiers that are sent to the controller, and the controller may display representations of these media content item identifiers. The search service may also send information to the controller indicating that such media content item identifiers correspond to media content items available through a media content service that is not associated with the media playback system, and the controller may treat these media content item identifiers differently based on this information. For instance, the controller may display representations of these media content items in a different manner, such as in a different color, in a less prominent size or position, or with some other visual indicator. Further, if a user selects a displayed representation of one of these media content item identifiers, then the controller may prompt the user to sign up for the associated media content service, such as by offering a free trial to the media content service. To facilitate this, the displayed prompt may include a link to an external site for registering with the media content service.

Further, while the examples described above in connection with FIG. 6 do not explicitly describe the use of a database, such as database 902, in connection with the search service, it should be understood that aspects of the database 902 can be incorporated into the process described in connection with FIG. 6. For example, in connection with FIG. 6, the search service may maintain a database that includes some or all of the media content item data 904, the user preference data 906, the user search data 908, and the media engagement data 910. The search service may use such data in the same or similar manner as described above in connection with FIG. 10, such as by using the user preference data 906 to organize the search results in a particular order. Further, any of the other uses of the database 902 that can be applied to the process in FIG. 6 are contemplated herein as well.

FIGS. 6 and 10 include one or more operations, functions, or actions as illustrated by one or more of operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts shown in FIGS. 6 and 10 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIGS. 6 and 10 may represent circuitry and/or machinery that is wired or arranged to perform the specific functions in the process.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing system comprising:

at least one processor;

at least one non-transitory computer-readable medium; and program instructions stored on the at least one non-transitory computer-readable medium that, when executed by the at least one processor, cause the computing system to:

generate a set of simulated search queries to obtain information for media content items available through a plurality of media content services;

transmit the generated set of simulated search queries to the plurality of media content services;

obtain, from the plurality of media content services, information for the media content items;

based on the obtained information for the media content items, generate a plurality of media content item identifiers that each corresponds to a respective media content item available through the plurality of media content services, wherein each generated media content item identifier is associated with a respective category of media content items from among a plurality of categories of media content items;

include the plurality of generated media content item identifiers in a database maintained by the computing system;

receive, from a controller configured to control media playback by one or more playback devices in a media playback system, a search query, wherein the media playback system is associated with at least a first media content service and a second media content service of the plurality of media content services;

based on the search query, identify within the database (i) a first set of generated media content item identifiers corresponding to media content items available through the first media content service and (ii) a second set of generated media content item identifiers corresponding to media content items available through the second media content service;

aggregate the first set of generated media content item identifiers and the second set of generated media content item identifiers into an aggregated set of generated media content item identifiers such that respective generated media content item identifiers in the aggregated set are organized based on (i) the categories of media content items corresponding to the respective generated media content item identifiers and (ii) the media content services from which the media content items corresponding to the respective generated media content item identifiers are available; and send the aggregated set of generated media content item identifiers to the controller.

2. The computing system of claim 1, further comprising program instructions stored on the at least one non-transitory computer-readable medium that, when executed by the at least one processor, cause the computing system to:

transmit one or more user-initiated search queries to each media content service of the plurality of media content services;

receive, from each media content service of the plurality of media content services, a respective search result; and include the received search results in the database.

3. The computing system of claim 2, further comprising program instructions stored on the at least one non-transitory computer-readable medium that, when executed by the at least one processor, cause the computing system to:

receive, from the controller, a given search query;

based on the given search query, generate a respective set of search queries corresponding to each of the media content services of the plurality of media content services;

transmit, to each media content service of the plurality of media content services, the respective set of search queries;

receive, from each media content service of the plurality of media content services, a respective search result;

compare the received search results to the plurality of generated media content item identifiers in the database and thereby identify at least one missing or incorrect media item data; and update the database to correct the at least one missing or incorrect media item data.

4. The computing system of claim 1, wherein the database comprises, for each generated media content item identifier, information identifying a name of the corresponding media content item, information identifying a category of media content items to which the corresponding media content item belongs, and information for accessing the corresponding media content item from one or more of the plurality of media content services.

5. The computing system of claim 4, wherein the information for accessing the corresponding media content item from one or more of the plurality of media content services comprises a uniform resource identifier (URI) or a uniform resource locator (URL).

6. The computing system of claim 1, further comprising program instructions stored on the at least one non-transitory computer-readable medium that, when executed by the at least one processor, cause the computing system to:

maintain user preference data comprising an indication that the first media content service is preferred over the second media content service in connection with the first and second sets of generated media content item identifiers;

wherein the program instructions that, when executed by the at least one processor, cause the computing system to aggregate the first set of generated media content item identifiers and the second set of generated media content item identifiers into the aggregated set of generated media content item identifiers comprise program instructions that, when executed by the at least one processor, cause the computing system to arrange the first set of generated media content item identifiers before the second set of generated media content item identifiers in the aggregated set of generated media content item identifiers.

7. The computing system of claim 6, wherein the user preference data comprises one or both of (i) user preference data corresponding to a user of the media playback system or (ii) user preference data corresponding to one or more users of other respective media playback systems in communication with the computing system.

8. A non-transitory computer-readable medium, wherein the non-transitory computer-readable medium is provisioned with program instructions that, when executed by at least one processor, cause a computing system to:

generate a set of simulated search queries to obtain information for media content items available through a plurality of media content services;

transmit the generated set of simulated search queries to the plurality of media content services;

obtain, from the plurality of media content services, information for the media content items;

based on the obtained information for the media content items, generate a plurality of media content item identifiers that each corresponds to a respective media content item available through the plurality of media content services, wherein each generated media content item identifier is associated with a respective category of media content items from among a plurality of categories of media content items;

include the plurality of generated media content item identifiers in a database maintained by the computing system;

receive, from a controller configured to control media playback by one or more playback devices in a media playback system, a search query, wherein the media playback system is associated with at least a first media content service and a second media content service of the plurality of media content services;

based on the search query, identify within the database (i) a first set of generated media content item identifiers corresponding to media content items available through the first media content service and (ii) a second set of generated media content item identifiers corresponding to media content items available through the second media content service;

aggregate the first set of generated media content item identifiers and the second set of generated media content item identifiers into an aggregated set of generated media content item identifiers such that respective generated media content item identifiers in the aggregated set are organized based on (i) the categories of media content items corresponding to the respective generated media content item identifiers and (ii) the media content services from which the media content items corresponding to the respective generated media content item identifiers are available; and send the aggregated set of generated media content item identifiers to the controller.

9. The non-transitory computer-readable medium of claim 8, wherein the non-transitory computer-readable medium is further provisioned with program instructions that, when executed by at least one processor, cause the computing system to:

transmit one or more user-initiated search queries to each media content service of the plurality of media content services;

receive, from each media content service of the plurality of media content services, a respective search result; and include the received search results in the database.

10. The non-transitory computer-readable medium of claim 9, wherein the non-transitory computer-readable medium is further provisioned with program instructions that, when executed by at least one processor, cause the computing system to:

receive, from the controller, a given search query;

based on the given search query, generate a respective set of search queries corresponding to each of the media content services of the plurality of media content services;

transmit, to each media content service of the plurality of media content services, the respective set of search queries;

receive, from each media content service of the plurality of media content services, a respective search result;

compare the received search results to the plurality of generated media content item identifiers in the database and thereby identify at least one missing or incorrect media item data; and update the database to correct the at least one missing or incorrect media item data.

11. The non-transitory computer-readable medium of claim 8, wherein the database comprises, for each generated media content item identifier, information identifying a name of the corresponding media content item, information identifying a category of media content items to which the corresponding media content item belongs, and information for accessing the corresponding media content item from one or more of the plurality of media content services.

12. The non-transitory computer-readable medium of claim 11, wherein the information for accessing the corresponding media content item from one or more of the plurality of media content services comprises a uniform resource identifier (URI) or a uniform resource locator (URL).

13. The non-transitory computer-readable medium of claim 8, wherein the non-transitory computer-readable medium is further provisioned with program instructions that, when executed by at least one processor, cause the computing system to:

maintain user preference data comprising an indication that the first media content service is preferred over the second media content service in connection with the first and second sets of generated media content item identifiers;

wherein the program instructions that, when executed by at least one processor, cause the computing system to aggregate the first set of generated media content item identifiers and the second set of generated media content item identifiers into the aggregated set of generated media content item identifiers comprise program instructions that, when executed by at least one processor, cause the computing system to arrange the first set of generated media content item identifiers before the second set of generated media content item identifiers in the aggregated set of generated media content item identifiers.

14. The non-transitory computer-readable medium of claim 13, wherein the user preference data comprises one or both of (i) user preference data corresponding to a user of the media playback system or (ii) user preference data corresponding to one or more users of other respective media playback systems in communication with the computing system.

15. A method carried out by a computing system, the method comprising:

generating a set of simulated search queries to obtain information for media content items available through a plurality of media content services;

transmitting the generated set of simulated search queries to the plurality of media content services;

obtaining, from the plurality of media content services, information for the media content items;

based on the obtained information for the media content items, generating a plurality of media content item identifiers that each corresponds to a respective media content item available through the plurality of media content services, wherein each generated media content item identifier is associated with a respective category of media content items from among a plurality of categories of media content items;

including the plurality of generated media content item identifiers in a database maintained by the computing system;

receiving, from a controller configured to control media playback by one or more playback devices in a media playback system, a search query, wherein the media playback system is associated with at least a first media content service and a second media content service of the plurality of media content services;

based on the search query, identifying within the database (i) a first set of generated media content item identifiers corresponding to media content items available through the first media content service and (ii) a second set of generated media content item identifiers corresponding to media content items available through the second media content service;

aggregating the first set of generated media content item identifiers and the second set of generated media content item identifiers into an aggregated set of generated media content item identifiers such that respective generated media content item identifiers in the aggregated set are organized based on (i) the categories of media content items corresponding to the respective generated media content item identifiers and (ii) the media content services from which the media content items corresponding to the respective generated media content item identifiers are available; and sending the aggregated set of generated media content item identifiers to the controller.

16. The method of claim 15, further comprising:

transmitting one or more user-initiated search queries to each media content service of the plurality of media content services;

receiving, from each media content service of the plurality of media content services, a respective search result; and including the received search results in the database.

17. The method of claim 16, further comprising:

receiving, from the controller, a given search query;

based on the given search query, generating a respective set of search queries corresponding to each of the media content services of the plurality of media content services;

transmitting, to each media content service of the plurality of media content services, the respective set of search queries;

receiving, from each media content service of the plurality of media content services, a respective search result;

comparing the received search results to the plurality of generated media content item identifiers in the database and thereby identifying at least one missing or incorrect media item data; and updating the database to correct the at least one missing or incorrect media item data.

18. The method of claim 15, wherein the database comprises, for each generated media content item identifier, information identifying a name of the corresponding media content item, information identifying a category of media content items to which the corresponding media content item belongs, and information for accessing the corresponding media content item from one or more of the plurality of media content services.

19. The method of claim 18, wherein the information for accessing the corresponding media content item from one or more of the plurality of media content services comprises a uniform resource identifier (URI) or a uniform resource locator (URL).

20. The method of claim 15, further comprising:

maintaining user preference data comprising an indication that the first media content service is preferred over the second media content service in connection with the first and second sets of generated media content item identifiers;

wherein aggregating the first set of generated media content item identifiers and the second set of generated media content item identifiers into the aggregated set of generated media content item identifiers comprises arranging the first set of generated media content item identifiers before the second set of generated media content item identifiers in the aggregated set of generated media content item identifiers.

* * * * *